(12) United States Patent
Wasamoto et al.

(10) Patent No.: US 9,979,850 B2
(45) Date of Patent: May 22, 2018

(54) PRINTER AND PRINTER CONTROL METHOD ENABLING CONSISTENTLY READING SETTINGS INFORMATION

(71) Applicant: SEIKO EPSON CORPORATION, Tokyo (JP)

(72) Inventors: Tsuyoshi Wasamoto, Matsumoto (JP); Atsushi Yamaji, Matsumoto (JP); Makoto Ikeda, Matsumoto (JP); Tsutomu Nobutani, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/423,273

(22) Filed: Feb. 2, 2017

(65) Prior Publication Data
US 2017/0230527 A1      Aug. 10, 2017

(30) Foreign Application Priority Data

Feb. 5, 2016    (JP) ................................. 2016-020772
Feb. 5, 2016    (JP) ................................. 2016-020807
Feb. 5, 2016    (JP) ................................. 2016-020808

(51) Int. Cl.
| G06F 15/00 | (2006.01) |
| G06F 3/12  | (2006.01) |
| G06K 1/00  | (2006.01) |
| H04N 1/00  | (2006.01) |

(52) U.S. Cl.
CPC ..... *H04N 1/00973* (2013.01); *H04N 1/00342* (2013.01)

(58) Field of Classification Search
CPC ........... H04N 1/00973; H04N 1/00342; H04N 2201/0082

USPC ............................... 358/1.15, 1.13, 1.14, 1.1
See application file for complete search history.

(56) References Cited

U.S. PATENT DOCUMENTS

| 6,802,659 | B2 * | 10/2004 | Cremon ..................... B41J 5/30 400/61 |
| 2005/0066072 | A1 * | 3/2005 | Nakamura ............ G06F 3/1203 710/8 |
| 2009/0185218 | A1 | 7/2009 | Azami |
| 2009/0262382 | A1 | 10/2009 | Nobutani |
| 2011/0205581 | A1 | 8/2011 | Machii et al. |
| 2016/0210090 | A1 * | 7/2016 | Shimizu ................ G06F 3/1231 |

FOREIGN PATENT DOCUMENTS

| JP | 2011-164872 A | 8/2001 |
| JP | 2006-289690 A | 10/2006 |
| JP | 2007-072742 A | 3/2007 |
| JP | 2007-074344 A | 3/2007 |
| JP | 2007-074346 A | 3/2007 |
| JP | 2007-156774 A | 6/2007 |
| JP | 2009-175951 A | 8/2009 |
| JP | 2010-154557 A | 7/2010 |

* cited by examiner

*Primary Examiner* — Douglas Tran
(74) *Attorney, Agent, or Firm* — Foley & Lardner LLP

(57) ABSTRACT

To reliably read settings information PD (network settings PD1, printer settings PD2) from memory and correctly set the settings information PD in a printer, a wireless tag 62 storing the settings information PD is disposed to a cover member 40b that is removably installable to a network-connectable printing unit 40a, a reading device 60 that reads the settings information PD from the wireless tag 62 is disposed to the printing unit 40a, and a configurator 50b configures settings based on the read settings information PD.

18 Claims, 27 Drawing Sheets

PRINTER AND PRINTER CONTROL METHOD ENABLING CONSISTENTLY READING SETTINGS INFORMATION

The present invention claims priority to Japanese Application Nos. 2016-20772 filed on Feb. 5, 2016, 2016-20807 filed on Feb. 5, 2016, and 2016-20808 filed on Feb. 5, 2016, which are hereby incorporated by references in their entirety.

BACKGROUND

1. Technical Field

The present invention relates to a printer and printer control method.

2. Related Art

Printers (networkable printers) that communicate with a host computer using a network address (such as an IP address) are known.

When a printer of this type (referred to below as the original printer) is replaced with another printer (referred to below as the replacement printer), such as when a malfunctioning printer is replaced with a normally operating printer, the replacement printer is configured based on settings information (the settings) of the original printer. The settings may including network settings (such as the IP address), or printer settings (such as the paper width, print area, print density, print speed).

However, some degree of technical knowledge or a dedicated device is needed to set the settings in the replacement printer. When, for example, a printer is replaced in a supermarket or other kind of store where a POS system is used, it can therefore be difficult for a non-technical user (such as a store employee) to quickly and accurately set the printer settings in the replacement printer.

JP-A-2007-74344, for example, therefore proposes, when replacing a printer, reading the settings information wirelessly by a reader/writer from a wireless tag (such as an RF tag) attached to a communication cable, and transferring the settings that are read to the replacement printer.

JP-A-2011-164872 proposes a printer having an interface to which USB memory or other external memory device can connect, determining if external memory is connected to the interface, reading any settings information from the external memory device if an external memory device is connected, and configuring the replacement printer based on the read settings information.

While the technologies taught in JP-A-2007-74344 and JP-A-2011-164872 enable setting the settings information in the replacement printer relatively easily, problems remain.

In JP-A-2007-74344, for example, the RF tag is attached to a flexible communication cable (the cable itself), and the relative positions of the RF tag and the reader/writer are not always the same. Therefore, depending on the relative positions of the RF tag and reader/writer, the replacement printer may not be able to reliably read the settings information from the RF tag. As a result, the settings information may not be quickly and correctly set in the replacement printer.

JP-A-2011-164872 does not apply to a printer having a first circuit board (such as an expansion board) with a network connectable first interface, and a second circuit board (such as a main circuit board) with a second interface connectable to the first circuit board, and in a printer having such a first circuit board and second circuit board, appropriately setting the settings information may not be possible even if the settings are set using the method described in JP-A-2011-164872.

SUMMARY

At least one of objective of the invention is therefore to provide a printer and a printer control method enabling consistently reading settings information (such as network settings and printer settings) from an RF tag, and thereby enabling quickly and accurately setting the settings information.

Another objective of the invention is to provide a printer and a printer control method enabling even a non-technical user to quickly and accurately set the settings information in a printer having a first circuit board and second circuit board (such as a replacement printer or new printer).

A printer according to a first aspect of the invention has a print mechanism; a first communicator configured to communicate through a network with a computer; a connector to which a member having memory storing settings information including network settings information can removably connect; a first detector configured to detect if the member is connected to the connector; a reader configured to read the settings information from the memory of the member when installation of the member to the connector is detected by the first detector; and a configurator configured to set a network setting of the first communicator based on the settings information read by the reader.

This configuration enables reliably configuring network settings as a result of the user simply connecting a member with memory to a connector of the printer. Even non-technical users can therefore quickly and accurately configure settings information.

Another aspect of the invention is a control method of a printer having a first communicator able to communicate through a network with a computer, a connector to which a member having memory storing settings information including network settings information can removably connect, a first detector configured to detect if the member is connected to the connector, storage storing a program, and a processor that reads and executes the program from the storage, the control method, using the processor: reading the settings information from the memory of the member when installation of the member to the connector is detected by the first detector; and setting a network setting of the first communicator based on the settings information.

This configuration enables configuring network settings as a result of the user simply connecting a member with memory to a connector of the printer. Even non-technical users can therefore quickly and accurately configure settings information.

DESCRIPTION OF EMBODIMENTS

Figure 1:
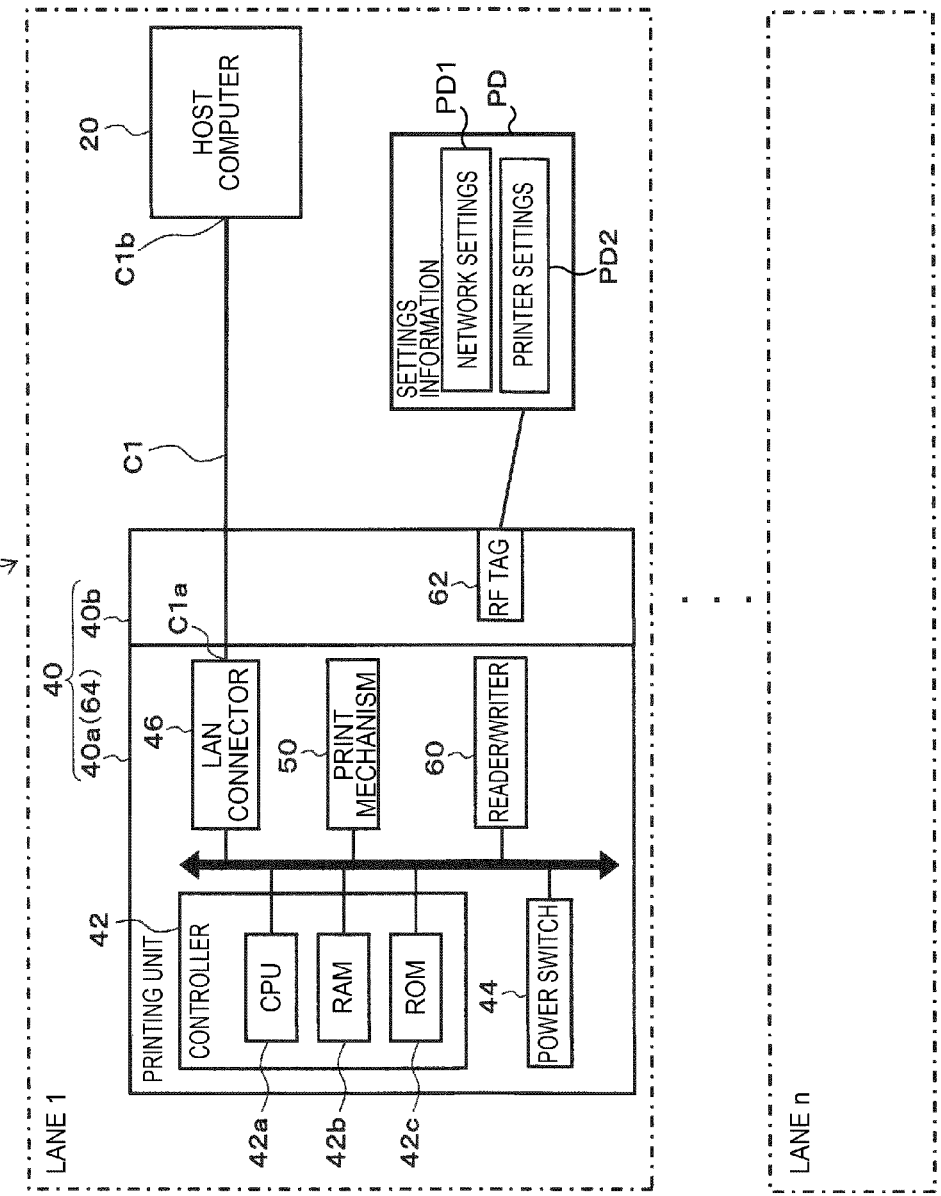
FIG. 1 illustrates the configuration of a POS system 10 in which a printer and printer control method according to the first of the invention are used.

A first embodiment of the present invention is described below with reference to the accompanying figures. It should be noted that like parts in the embodiments described below are identified by like reference numerals, and redundant description thereof is omitted below.

A preferred embodiment of a printer and a printer control method according to the invention are described first.

Figure 3:
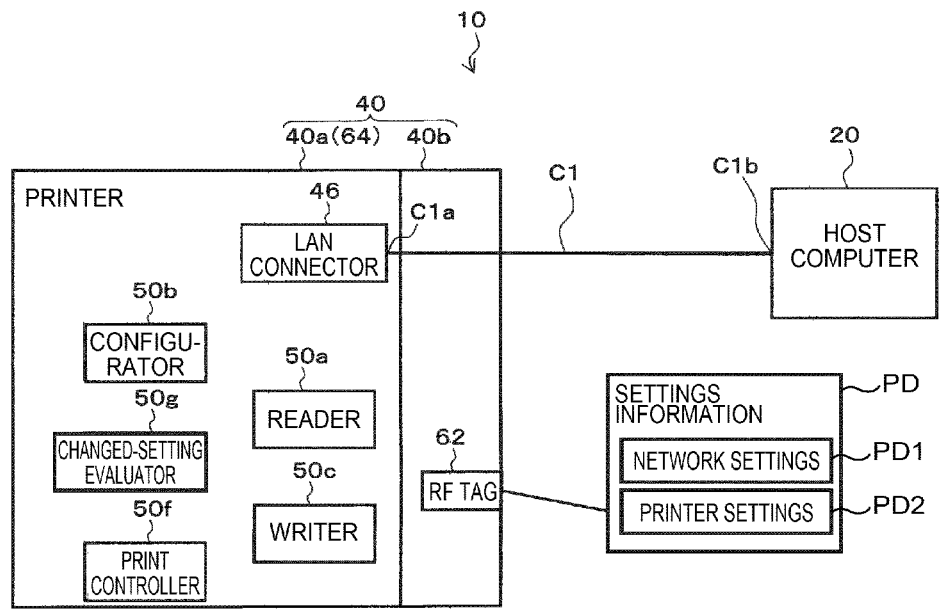
FIG. 3 is a block diagram of the functional configuration of a printer 40.

FIG. 1 illustrates the configuration of a POS system 10 in which a printer and a printer control method according to the invention are used. FIG. 3 is a block diagram of an example of the functional configuration of the printer 40.

As shown in FIG. 1 and FIG. 3, the printer 40 according to the first embodiment of the invention has a network connectable printing unit 40a, and a cable cover 40b (cover member) that is removably connected to the printing unit 40a. The printer 40 also has, disposed to the cable cover 40b, an RF tag 62 (wireless tag) storing settings information PD including network settings PD1; and disposed to the printing unit 40a, a reader/writer 60 (reading device) for wirelessly reading the settings information PD from the RF tag 62, and a configurator 50b for configuring settings based on the settings information PD read by the reader/writer 60.

A printer (and printer control method) enabling stably (reliably) reading settings information PD (for example, network settings PD1 and printer settings PD2) from a RF tag 62 are embodied by the printer 40 according to the first embodiment of the invention.

More specifically, because the RF tag 62 is disposed to the cable cover 40b, when the cable cover 40b with the RF tag 62 is connected to the printing unit 40a, the RF tag 62 and reader/writer 60 are in fixed positions relative to each other. As a result, settings information PD can be read wirelessly from the RF tag 62 in its fixed relative position.

A POS system 10 in which the printer and printer control method according to the invention are deployed is described next with reference to the accompanying figures.

As shown in FIG. 1, the POS system 10 includes a host computer 20, and printer 40. The host computer 20 and printer 40 are installed at each checkout lane (lane 1 to lane n) in a supermarket or other store.

The host computer 20 is described first.

While not shown in the figures, the hardware configuration of the host computer 20 includes a CPU and RAM, ROM, hard disk drive, and interfaces connected to the CPU through respective buses.

The printer 40 is connected to the host computer 20 through an interface. Also connected to the host computer 20 through appropriate interfaces are (not shown) a barcode reader for reading barcodes, a keyboard for inputting information including the payment amount received from a customer, for example, and a display for displaying product name and price information, for example.

The functional configuration of the host computer 20 includes functions for executing a transaction process based on input from the barcode reader and keyboard; generating print data; and communicating with the printer 40 through the LAN cable C1 (typically an Ethernet® cable). More specifically, the host computer 20 has functions for sending print data through the LAN cable C1 to the printer 40; setting the settings information PD in the printer 40 (ROM 42c); and changing the settings information PD stored in the ROM 42c of the printer 40.

These functions are embodied mainly by the host computer 20 (CPU) running specific programs read from ROM or hard disk drive to RAM (more specifically, the operating system, POS application, printer driver, and utility for setting or changing printer information (settings)). While not shown in the figures, the host computer 20 is connected to the store network through an interface.

An example of a printer 40 according to this embodiment is described next.

The printer 40 in this example is a receipt printer (such as a dot impact, thermal, or inkjet printer), and as shown in FIG. 1 includes a network connectable printing unit 40a, and a cable cover 40b (cover member) removably attached to the printing unit 40a (case 64).

The hardware configuration of the printing unit 40a includes a controller 42, and, connected thereto through a bus, a power switch 44, LAN connector 46, print mechanism 50, reader/writer 60, and an enclosing plastic case 64 (printer case).

The controller 42 includes a CPU 42a, RAM 42b, and ROM 42c. The ROM 42c is flash ROM or other type of rewritable nonvolatile memory device, and includes a storage area for storing network settings PD1, which can be set or changed by the configurator 50b described below (or an operation of the host computer 20), and a storage area (such as a memory switch) for storing printer settings PD2 that are set or changed by an operation of the host computer 20 (or an operation of the printer 40).

A program such as firmware (control program), the printer ID, and lane information are stored in the ROM 42c. The printer ID and lane information are written at a specific time to the RF tag 62 by the reader/writer 60. The replacement history and other information about the printer 40 at each lane can be known by referencing (or printing) the printer ID and lane information written (stored) in the RF tag 62.

The power switch 44 is a power supply switch for turning the power supply to the printer 40 on and off.

The LAN connector 46 is a connector for connecting the printer 40 to the host computer 20. The printer 40 (LAN connector 46) and host computer 20 can be connected by a LAN cable C1 as shown in FIG. 1. More specifically, one plug C1a of the LAN cable C1 is connected to the printer 40 (LAN connector 46), and the other plug C1b is connected to the host computer 20.

The print mechanism 50 includes a printhead, paper conveyance mechanism, and paper cutting mechanism (all not shown).

The reader/writer 60 wirelessly reads settings information PD from a RF tag 62, or wirelessly writes settings information PD to the RF tag 62.

Figure 2:
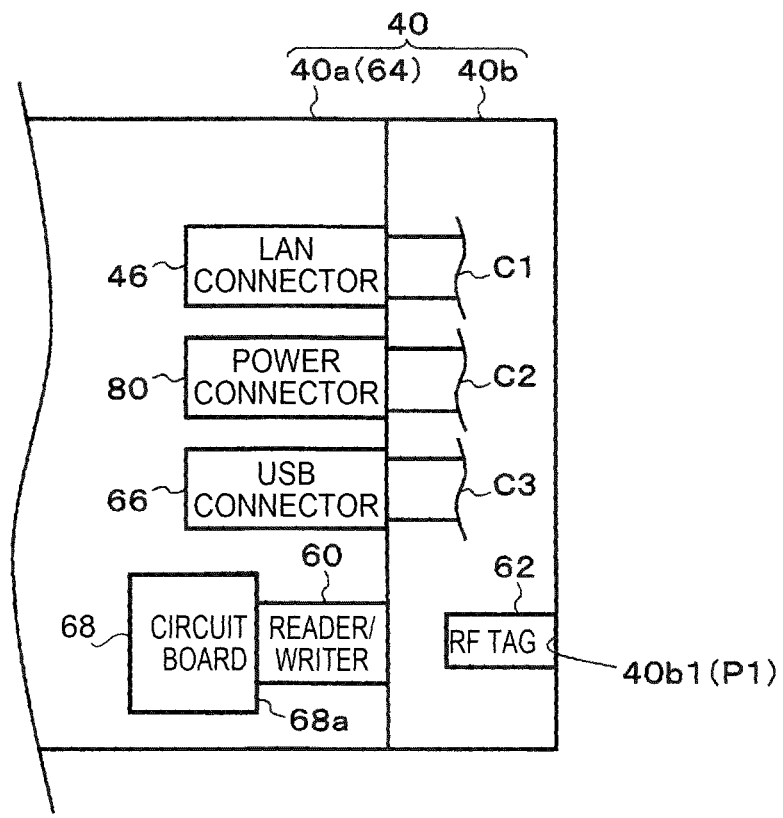
FIG. 2 illustrates the relative positions of an RF tag 62 disposed to a cable cover 40b, and a reader/writer 60.

As shown in FIG. 2, the cable cover 40b is a plastic cover member that covers at least part of the cables leading from the printer 40 (the case 64 of the printing unit 40a), or at least part of the connection to the printing unit 40a (case 64), and is provided for protection from external impact and liquids. The cables may including, for example, a LAN cable C1 connected to the LAN connector 46, a power cable C2 connected to the power connector 80, and a USB cable C3 connected to a USB connector 66. FIG. 2 illustrates the relative positions of an RF tag 62 disposed to a cable cover 40b, and a reader/writer 60. The cable cover 40b is removably connected at a fixed position on the back (or side or bottom, for example) of the printing unit 40a (case 64).

Various means not shown in the figures may be used to keep the cable cover 40b removably attached at a fixed position to the printing unit 40a, such as a lance (or receiver) disposed to the cable cover 40b, and a receiver (or lance) that is engaged by the lance and is disposed to the printing unit 40a (for example, case 64) (see, for example, JP-A-2011-72065).

RF tag 62 is disposed to the cable cover 40b. More specifically, when the cable cover 40b is installed to the fixed position of the printing unit 40a, the RF tag 62 is fastened by adhesive, for example, to a position where it can be reliably read/written by the reader/writer 60. In the example in FIG. 2, the RF tag 62 is attached to a position P1 on the cable cover 40b (preferably, inside surface 40b1) directly opposite the reader/writer 60 (or on the surface 68a of the circuit board 68 on which the reader/writer 60 is mounted).

Settings information PD including network settings PD1 are stored in the RF tag 62 (more specifically, in memory of the RF tag) (see FIG. 1). The settings information PD includes at least one of network settings PD1 and printer settings PD2. Other information such as the printer ID and lane information is also stored on the RF tag 62. Note that the RF tag 62 may also be referred to an electronic tag, IC tag, wireless tag, or RFID tag.

The network settings PD1 include, for example, a unique IP address assigned to the printer 40 (or to the lane where the printer 40 is located). The printer settings PD2 include, for example, paper width, print area, print density, printing speed, font settings, and margin settings. The printer ID is an identifier (such as the serial number) uniquely assigned to the specific printer 40. The lane information is a unique identifier assigned to the lane where the printer 40 is used.

As shown in FIG. 3, the functional configuration of the printer 40 includes a reader 50a, configurator 50b, writer 50c, print controller 50f, and changed-setting evaluator 50g.

These functions are embodied mainly by the printer 40 (CPU 42a) reading and running a specific program, such as firmware, read from ROM 42c to RAM 42b.

The reader 50a, at a specific time, wirelessly reads the settings information PD from the RF tag 62. The reader 50a is embodied by the reader/writer 60 (reading device).

The specific time is, for example, when the cable cover 40b with the RF tag 62 is installed to the printing unit 40a, and the power switch 44 of the printer 40 is turned on.

The configurator 50b sets the settings information PD the reader 50a read in the printer 40. More specifically, the configurator 50b stores the settings information PD the reader 50a read in the ROM 42c of the printer 40.

The writer 50c wirelessly writes the settings information PD to the RF tag 62. The writer 50c is embodied by the reader/writer 60 (writing device).

For example, when the changed-setting evaluator 50g described below determines that at least part of the settings information PD stored in the ROM 42c of the printer 40 changed, the writer 50c wirelessly writes the new settings information PD to the RF tag 62.

The print controller 50f, based on settings information PD received from the host computer 20 (and the printer settings PD2 stored in ROM 42c), controls the print mechanism 50 to print a receipt.

The changed-setting evaluator 50g determines whether or not at least part of the settings information PD stored in the ROM 42c of the printer 40 changed.

An example of an operation (a printer control method) of the printer 40 according to the first embodiment of the invention is described next with reference to FIG. 4.

Figure 4:
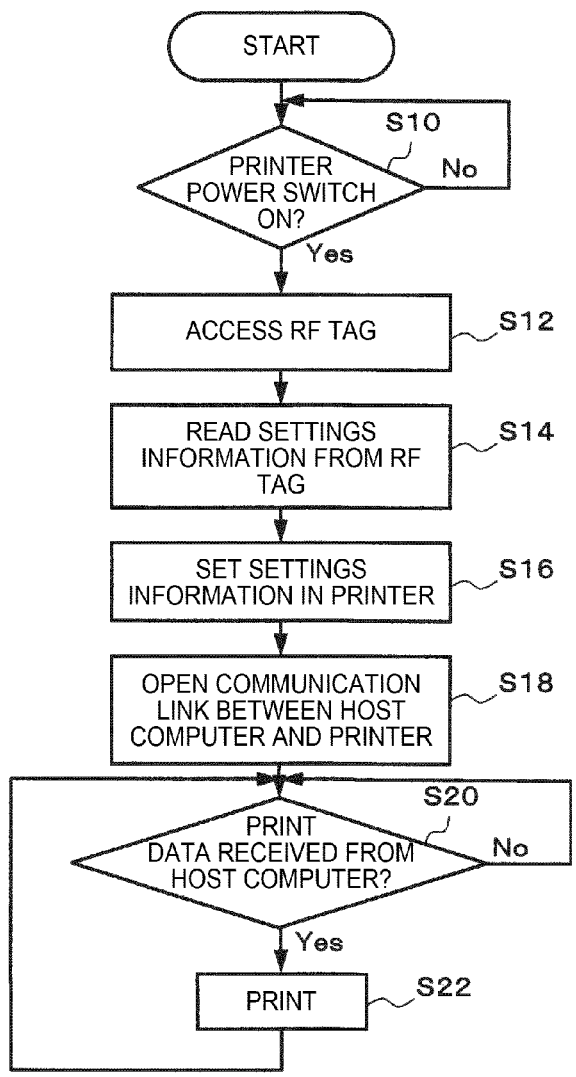
FIG. 4 is a flow chart describing an operation of the printer 40 according to the first embodiment of the invention.

FIG. 4 is a flow chart of an operation of the printer 40 according to the first embodiment of the invention.

This example describes the operation executed when a printer 40 installed at a specific lane (for example, lane 1) fails in the POS system 10 shown in FIG. 1, and the failed printer 40 (referred to below as original printer 40) is replaced with a separate, normally operating printer 40 (referred to below as replacement printer 40).

The process in FIG. 4 is a process executed, for example, by the replacement printer 40, primarily by the replacement printer 40 (CPU 42a) reading and running a specific program, such as firmware, read from ROM 42c to RAM 42b.

Note that in the following operation the network settings PD1 (IP address assigned to the lane) and the printer settings PD2 are previously stored as the settings information PD in the RF tag 62. Note, further, that the printer settings PD2 were written to the RF tag 62 as a result of a process executed by the printer 40 as described below (a process of writing the printer settings PD2 stored in the ROM 42c of the original printer 40 to the RF tag 62; see FIG. 5).

When the printer 40 installed at a specific lane (for example, lane 1) fails, the original printer 40 is replaced with the replacement printer 40 by the procedure described below before the process shown in FIG. 4 executes.

First, the replacement printer 40 (LAN connector 46) and the host computer 20 are connected. More specifically, LAN cable C1 is disconnected from the original printer 40 (LAN connector 46), and the disconnected LAN cable C1 is connected to the replacement printer 40 (LAN connector 46). At the same time, the cable cover 40b is disconnected from the original printer 40 (printing unit 40a), and the disconnected cable cover 40b is removably affixed to the replacement printer 40 (printing unit 40a) in the specific position. This has the following effect because the RF tag 62 storing the settings information PD is affixed to the cable cover 40b (see FIG. 1, FIG. 2).

First, by attaching the cable cover 40b to the printing unit 40a, the RF tag 62 disposed to the cable cover 40b is disposed to a position where it can be reliably read by the reader/writer 60, that is, a position opposite the reader/writer 60 (or opposite the surface 68a of the circuit board 68 on which the reader/writer 60 is mounted) (see FIG. 2).

Second, the positions of the RF tag 62 and reader/writer 60 relative to each other are held constant.

Third, because the RF tag 62 and reader/writer 60 are in fixed relative positions, the reader/writer 60 can more reliably wirelessly read the settings information PD from the RF tag 62 than in the related art. The reader/writer 60 can also reliably wirelessly write the settings information PD to the RF tag 62.

As described above, because a RF tag 62 storing settings information PD is disposed to the cable cover 40b, when the printer 40 is replaced, non-technical users can quickly and accurately set the settings information PD of the original printer 40 (for example, network settings PD1 and printer settings PD2) in the replacement printer 40.

Note that the replacement printer 40 (LAN connector 46) and the host computer 20 are connected while the power switch 44 of the replacement printer 40 is off.

Next, a store employee, for example, turns the power switch 44 of the replacement printer 40 on.

When the power switch 44 of the replacement printer 40 turns on, or the replacement printer 40 is reset by a received command or signal bus (step S10: Yes), the replacement printer 40 (reader 50a) accesses the RF tag 62 (step S12), and wirelessly reads the settings information PD from the RF tag 62 (step S14). This is an example of a read step of the invention.

Because network settings PD1 (IP address assigned to the lane) and printer settings PD2 are stored as the settings information PD in the RF tag 62, the network settings PD1 (IP address assigned to the lane) and printer settings PD2 are read as the settings information PD. Note that if configured so that at least one of network settings PD1 and printer settings PD2 is read, at least one of network settings PD1 and printer settings PD2 is read based on this setting.

As described above, the reader 50a, at a specific time, for example, when the cable cover 40b with the RF tag 62 is installed to the printing unit 40a, and the power switch 44 of the replacement printer 40 is turned on (step S10: Yes), the settings information PD is wirelessly read from the RF tag 62. More specifically, by turning the power switch 44 on, the settings information PD (for example, network settings PD1 and printer settings PD2) are reliably read from the RF tag 62.

Next, the replacement printer 40 (configurator 50b) sets the settings information PD the reader 50a read in the replacement printer 40 (step S16). This is an example of a configuration step of the invention. More specifically, the configurator 50b stores the settings information PD the reader 50a read in the ROM 42c of the printer 40.

As described above, the settings information PD (network settings PD1 and printer settings PD2) are quickly and accurately set in (transferred to) the replacement printer 40.

Next, based on the network settings PD1 (IP address) set in the replacement printer 40 as described above, a known process is executed to establish a communication link (such as a TCP connection) between the host computer 20 and the replacement printer 40 (step S18).

Thereafter, the replacement printer 40 communicates through the LAN cable C1 with the host computer 20 based on the network settings PD1 (IP address) set in the replacement printer 40.

Next, the replacement printer 40 (print controller 50f), when settings information PD is received from the host computer 20 through the LAN cable C1 (and LAN connector 46) (step S20: Yes), controls the print mechanism 50 and prints a receipt based on the received settings information PD and the printer settings PD2 set in the printer 40 as described above (step S22).

Next, an example of the process of writing the settings information PD (for example, printer settings PD2) stored in the ROM 42c of the printer 40 to the RF tag 62 is described next with reference to FIG. 5.

Figure 5:
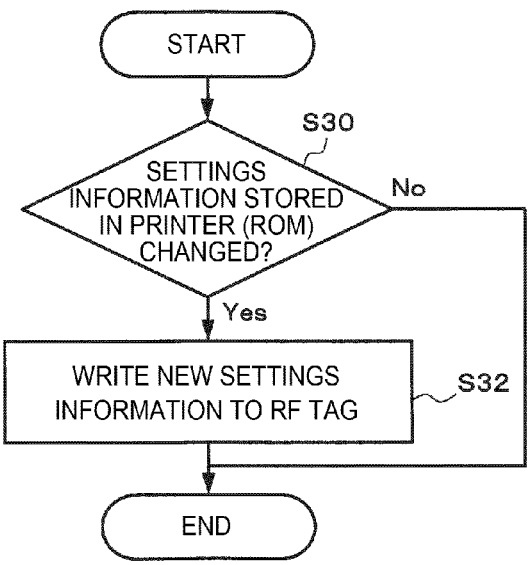
FIG. 5 is a flow chart of an example of a process for writing settings information PD (such as printer settings PD2) stored in ROM 42c of the original printer 40 to an RF tag 62.

FIG. 5 is a flow chart of a process of writing the settings information PD (for example, printer settings PD2) stored in the ROM 42c of the printer 40 to the RF tag 62.

The process shown in FIG. 5 is a process executed, for example, by the original printer 40 (and the replacement printer 40), primarily by the printer 40 (CPU 42a) reading and running a specific program, such as firmware, read from ROM 42c to RAM 42b.

The printer settings PD2 stored in the ROM 42c of the original printer 40 are written to the RF tag 62 whenever any part of the printer settings PD2 change. More specifically, the printer settings PD2 are written as described below. Note that at least part of the printer settings PD2 stored in the ROM 42c of the printer 40 may be changed by an operation of the host computer 20 (or an operation of the original printer 40).

First, the original printer 40 (changed-setting evaluator 50g) determines if at least part of the printer settings PD2 stored in the ROM 42c of the printer 40 changed (step S30).

If at least part of the printer settings PD2 stored in the ROM 42c of the printer 40 changed (for example, by an operation of the host computer 20) (step S30: Yes), the original printer 40 (writer 50c) wirelessly writes the new printer settings PD2 to the RF tag 62 (step S32).

As described above, the printer settings PD2 stored in the ROM 42c of the original printer 40 are written (for example, overwritten) to the RF tag 62 whenever part of the printer settings PD2 changes. Note that the network settings PD1 stored in the ROM 42c of the original printer 40 are also written (for example, overwritten) to the RF tag 62 whenever the network settings PD1 change.

As described above, the first embodiment of the invention provides a printer 40 and a printer control method that can reliably read settings information PD (for example, network settings PD1 and printer settings PD2) from the RF tag 62 (wireless tag) (and as a result can reliably and quickly set the settings information).

In other words, because the RF tag 62 is disposed to the cable cover 40*b* (cover member), when the cable cover 40*b* with the RF tag 62 is installed to the printing unit 40*a*, the cable cover 40*b* (and RF tag 62) and the printing unit 40*a* are integrated, and the RF tag 62 and reader/writer 60 (reading device) are held in fixed relative positions. As a result, settings information PD can be consistently read wirelessly from the RF tag 62 held in the fixed relative position.

The first embodiment also enables a non-technical user to quickly and accurately set the settings information PD of the original printer 40 in the replacement printer 40.

The first embodiment also enables a non-technical user to quickly and accurately set settings information PD that were changed on the original printer 40 by an operation of the host computer 20, for example, in the replacement printer 40.

Furthermore, the first embodiment enables a store employee, for example, to set (transfer) settings information PD to the replacement printer 40 by the extremely simple process of connecting the cable cover 40*b* disconnected from the original printer 40 (printing unit 40*a*) to the replacement printer 40 (printing unit 40*a*), and turning the power switch 44 of the replacement printer 40 on.

Note that this embodiment describes using a cable cover 40*b* as the cover member to which the RF tag 62 is disposed, but the invention is not so limited.

Figure 6:
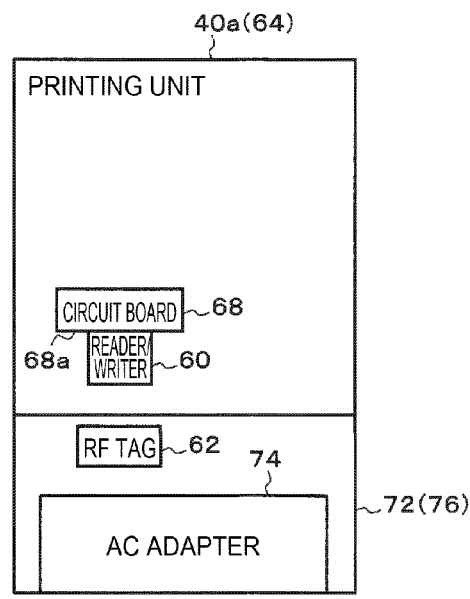
FIG. 6 shows another example of the printer 40.

For example, as shown in FIG. 6, an AC adapter unit 72 (storage tray 76) may be used as the cover member to which the RF tag 62 is disposed. FIG. 6 illustrates a variation of the configuration of the printer 40. The AC adapter unit 72 is described, for example, in JP-A-2011-72065.

The AC adapter unit 72 includes an AC adapter 74, and a storage tray 76 (cover member) that holds the AC adapter 74.

The AC adapter 74 is a power supply device that converts AC power to DC power, and supplies power to the printer 40.

The storage tray 76 is a plastic case that holds the AC adapter 74, and is removably installed to a fixed position on the bottom of the printing unit 40*a* (case 64).

Various means not shown in the figures may be used to keep the storage tray 76 removably attached at a fixed position to the printing unit 40*a*, such as a lance (or receiver) disposed to the cable cover 40*b*, and a receiver (or lance) that is engaged by the lance and is disposed to the printing unit 40*a* (for example, case 64).

When an AC adapter unit 72 (storage tray 76) is used as the cover member, the RF tag 62 is disposed, as shown in FIG. 6, to the AC adapter unit 72 (for example, storage tray 76). More specifically, when the AC adapter unit 72 (storage tray 76) is installed to the fixed position of the printing unit 40*a*, the RF tag 62 is fastened by adhesive, for example, to a position opposite the reader/writer 60 (or on the surface 68*a* of the circuit board 68 on which the reader/writer 60 is mounted) where it can be reliably read/written by the reader/writer 60.

Using a AC adapter unit 72 (storage tray 76) as the cover member in this way achieves the same effect as described in the first embodiment described above.

The embodiments described above use an RF tag as the RF tag 62 for storing settings information PD, and describe wirelessly reading the settings information PD from the RF tag 62 by a reader/writer 60, but the invention is not so limited and other wireless communication technologies, such as Bluetooth®, IrDA®, or NFC® may be used.

The printer 40 in the above embodiments is a receipt printer, but the invention is not so limited and can be applied to printers other than receipt printers.

Furthermore, the printer and printer control method of the invention are described using the example of a POS system 10 shown in FIG. 1 and applied to the replacement printer 40 when the printer 40 installed at a specific lane (for example, lane 1) fails and is replaced with a different normally operating printer 40, but the invention is not so limited.

For example, when a new printer 40 is installed to a specific lane (for example, lane n+1), the printer and printer control method of the invention can be applied to the newly installed printer 40.

The IP address is used as an example of the network settings information PD1 in the above example, but the invention is not so limited and a different network address may be used as the network settings PD1.

Variation 1

A printer 40A according to a first variation is described next with reference to the figures.

Figure 7:
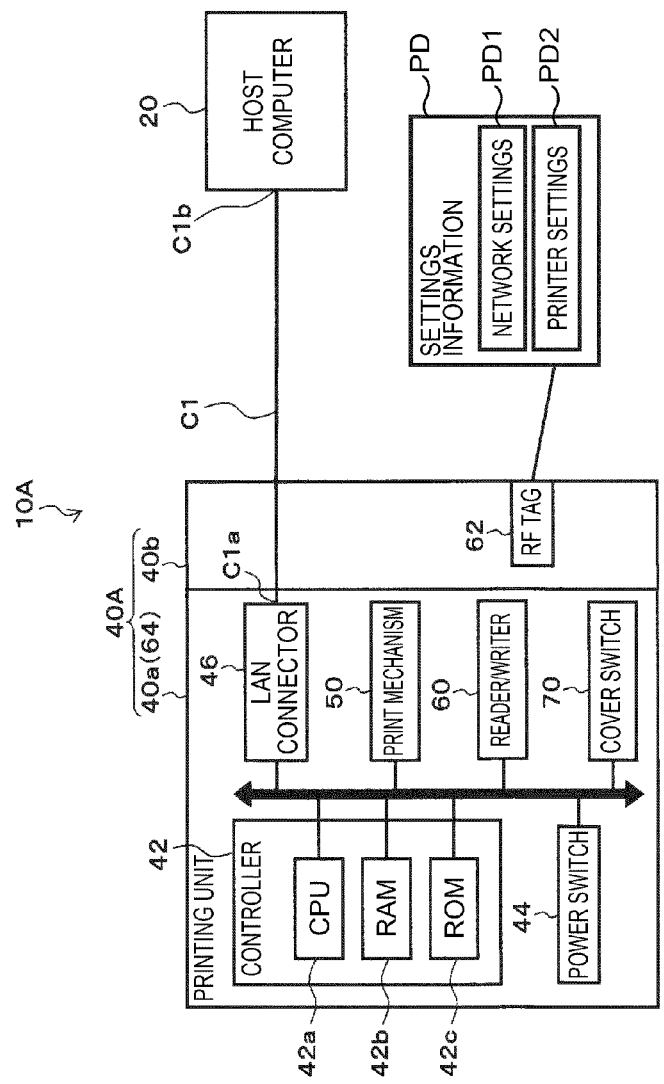
FIG. 7 illustrates the configuration of a system having a printer 40A according to a first variation of the invention.
Figure 8:
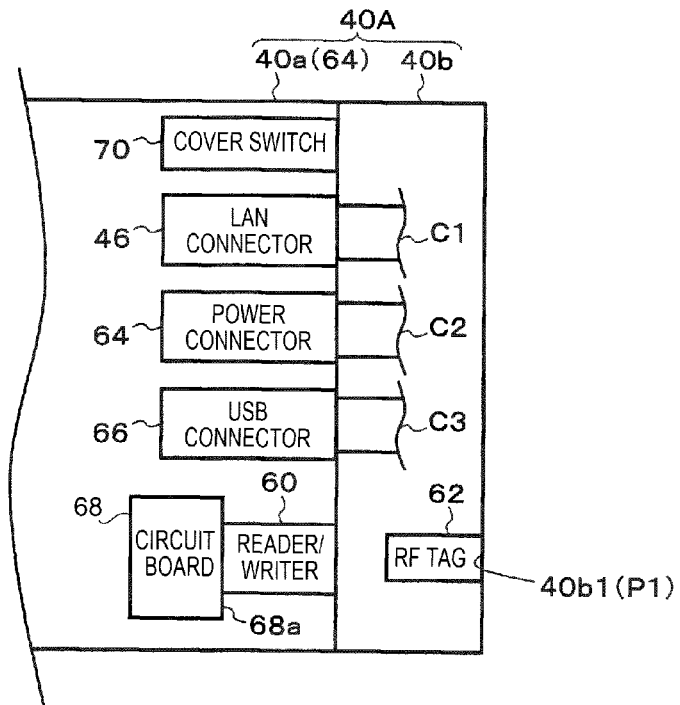
FIG. 8 illustrates the relative positions of an RF tag 62 disposed to a cable cover 40b, and a reader/writer 60.
Figure 9:
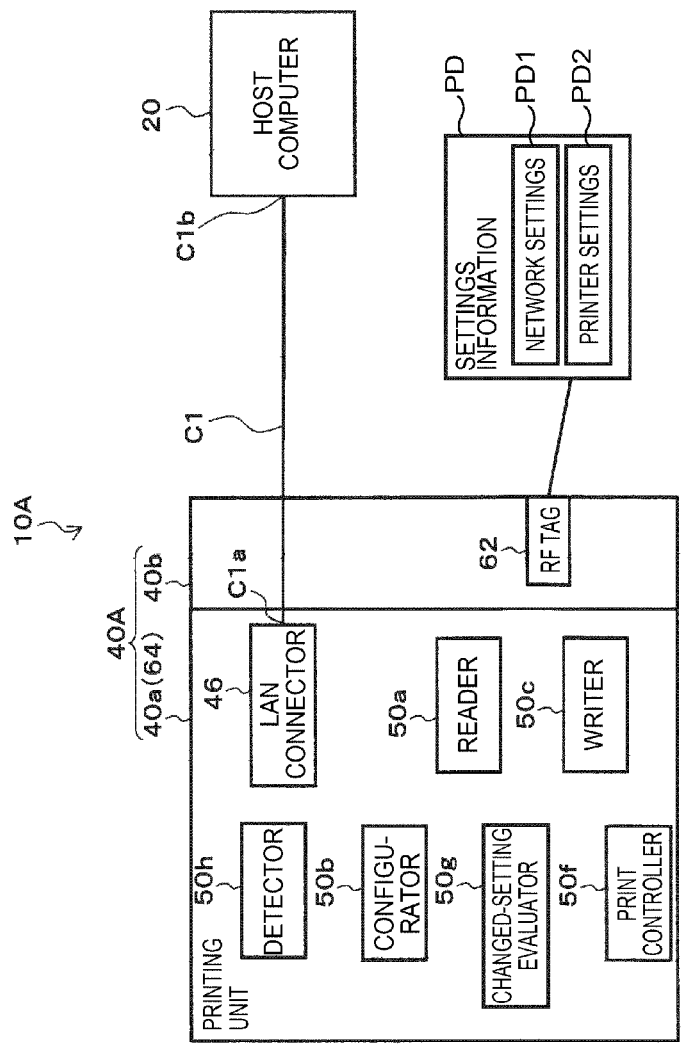
FIG. 9 illustrates the functional configuration of a printer 40A according to the first variation.

FIG. 7 illustrates the configuration of a POS system 10 including a printer 40A according to a first variation. FIG. 8 illustrates the relative positions of an RF tag 62 disposed to a cable cover 40*b*, and a reader/writer 60. FIG. 9 illustrates the functional configuration of a printer 40A according to the first variation.

As shown in FIG. 7 and FIG. 8, a printer 40A according to the first variation adds a cover switch 70 to the hardware configuration of the printer 40 shown in FIG. 1, as shown in FIG. 9 adds a detector 50*h* to the functional configuration of the printer 40 shown in FIG. 3, and is otherwise the same as the printer 40 described above. This printer 40A is described focusing on the differences with the printer 40 described above, like parts are referenced by like reference numerals, and further description thereof is omitted below.

The cover switch 70 is a switch that is on when the cable cover 40*b* is installed in position to the printing unit 40*a* (case 64), turns off when the cable cover 40*b* is disconnected from the printing unit 40*a*, and is connected through a bus to the controller 42 (see FIG. 7). The cover switch 70 may be a mechanical switch, an optical switch, or other type of switch. The cover switch 70 is disposed to the printing unit 40*a* so that (when the cover switch 70 is a mechanical switch) the cover switch 70 contacts part of the cable cover 40*b* and turns on when the cable cover 40*b* is installed in position to the printing unit 40*a*, and turns off when the cable cover 40*b* is disconnected from the printing unit 40*a* and contact with the cover switch 70 is lost.

The detector 50*h*, based on the state (on or off) of the cover switch 70, detects whether or not the cable cover 40*b* is connected to the printing unit 40*a* (case 64). More specifically, when the cable cover 40*b* is installed in position to the printing unit 40*a* (case 64) and the cover switch 70 is on, the detector 50*h* detects that the cable cover 40*b* is installed in position to the printing unit 40*a* (case 64). When the cable cover 40*b* is removed from the printing unit 40*a* (case 64) and the cover switch 70 turns off, the detector 50*h* detects that the cable cover 40*b* was removed from the printing unit 40*a* (case 64).

The detector 50*h* is embodied primarily by the printer 40A (CPU 42*a*) reading and running a specific program, such as firmware, read from ROM 42*c* to RAM 42*b*.

Next, an example of the operation (printer control method) of the printer 40A according to the first variation is described next with reference to FIG. 10.

Figure 10:
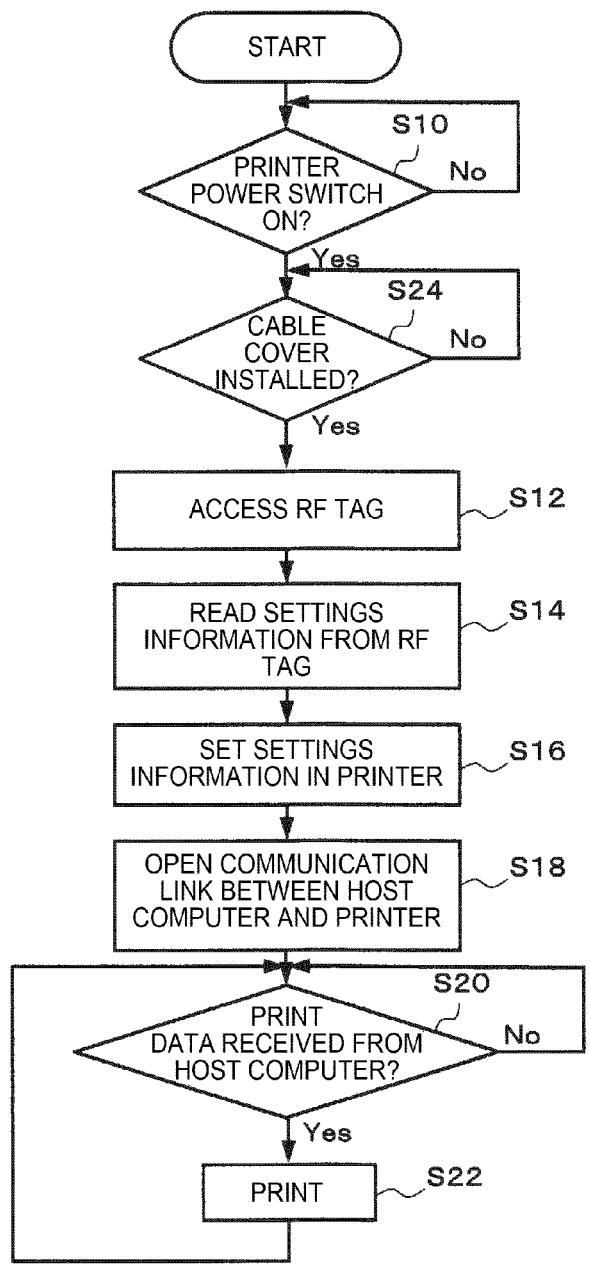
FIG. 10 is a flow chart of one example of the operation of the printer 40A according to the first variation.

FIG. 10 is a flow chart of an operation of the printer 40A according to the first variation.

The flow chart (FIG. 10) of the operation of the printer 40A according to the first variation adds a step S24 between step S10 and step S12 shown in the flow chart of the operation of the printer 40 described above in FIG. 4, and is otherwise the same as the flow chart of the operation of the printer 40 described above. Primarily the differences with the flow chart of the printer 40 described above are described below, like steps are identified by like reference numerals and further description thereof is omitted.

This example describes the operation executed when a printer 40A installed at a specific lane (for example, lane 1) fails in the POS system 10A shown in FIG. 7, and the failed printer 40A (referred to below as original printer 40A) is replaced with a separate, normally operating printer 40A (referred to below as replacement printer 40A).

The process in FIG. 10 is a process executed, for example, by the replacement printer 40A, primarily by the replacement printer 40A (CPU 42a) reading and running a specific program, such as firmware, read from ROM 42c to RAM 42b.

Note that in the following operation the network settings PD1 (IP address assigned to the lane) and the printer settings PD2 are previously stored as the settings information PD in the RF tag 62. Note, further, that the printer settings PD2 were written to the RF tag 62 as a result of the process shown in FIG. 5 (a process of writing the printer settings PD2 stored in the ROM 42c of the original printer 40 to the RF tag 62) being executed by the original printer 40A.

When the printer 40A installed at a specific lane (for example, lane 1) fails, the original printer 40A is replaced by a store employee, for example, with the replacement printer 40A by the procedure described above before the process shown in FIG. 10 executes.

Next, the store employee turns the power switch 44 of the replacement printer 40A on.

When the power switch 44 of the replacement printer 40 turns on (step S10: Yes), the replacement printer 40 (detector 50h) detects, based on the state (on, off) of the cover switch 70, if the cable cover 40b was installed to the printing unit 40a (case 64) (step S24).

If the cable cover 40b removed from the original printer 40A (printing unit 40a) is removably connected at the specific position to the replacement printer 40A (printing unit 40a), the cover switch 70 is on, and the detector 50h detects that the cable cover 40b was installed to the printing unit 40a (case 64) (step S24: Yes).

By the detector 50h thus detecting that the cable cover 40b was installed to the printing unit 40a (case 64) (step S24: Yes), steps S12 to S22 execute as described above. More specifically, the settings information PD are wirelessly read from the RF tag 62 disposed to the cable cover 40b installed to the replacement printer 40 (step S14). The read settings information PD are then set in the replacement printer 40 (step S16), and based on the set network settings PD1 (IP address), a communication link (such as a TCP connection) is established between the host computer 20 and replacement printer 40 (step S18). When print data is then received from the host computer 20 through the LAN cable C1 (and LAN connector 46) (step S20: Yes), based on the received print data and the printer settings PD2 set in the printer 40 as described above, the print mechanism 50 is controlled and a receipt is printed (step S22).

In addition to the effects of the embodiment described above, this first variation enables the settings information (for example, network settings PD1, printer settings) to be automatically and reliably read from the RF tag 62 (wireless tag) when the cable cover 40b (cover member) is installed to the printing unit 40a.

Note that in this first variation the timing when the cable cover 40b removed from the original printer 40A (printing unit 40a) is installed to the replacement printer 40A (printing unit 40a) is after the power switch 44 of the replacement printer 40 is turned on, but the invention is not so limited.

For example, the timing when the cable cover 40b removed from the original printer 40A (printing unit 40a) is installed to the replacement printer 40A (printing unit 40a) may be before the power switch 44 of the replacement printer 40 is turned on. This has the same effect as described above.

Note that this variation describes using a cable cover 40b as the cover member to which the RF tag 62 is disposed, but the invention is not so limited.

Figure 11:
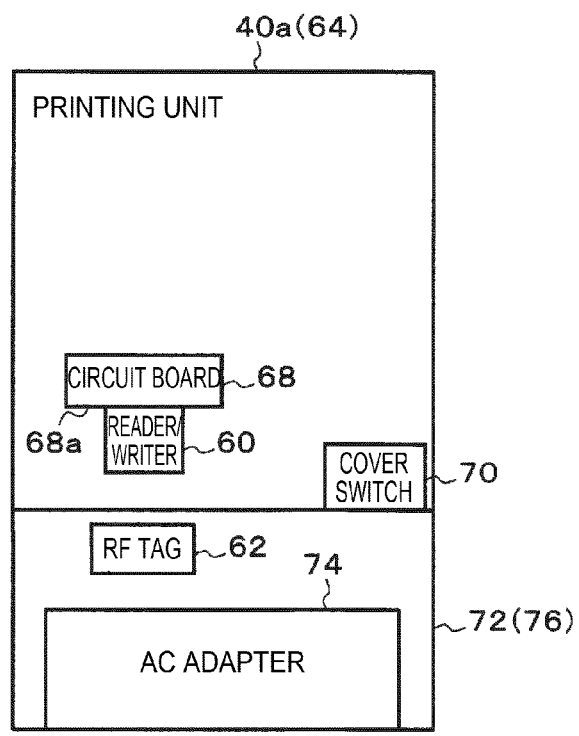
FIG. 11 illustrates the configuration of a variation of the printer 40A.

For example, as shown in FIG. 11, an AC adapter unit 72 (storage tray 76) may be used as the cover member to which the RF tag 62 is disposed.

When an AC adapter unit 72 (storage tray 76) is used as the cover member, the cover switch 70 contacts part of the AC adapter unit 72 and turns on when the AC adapter unit 72 is installed to the specific position of the printing unit 40a (case 64), and turns off when the AC adapter unit 72 is disconnected from the printing unit 40a and contact with the cover switch 70 is lost (when the cover switch 70 is a mechanical switch).

The same effect is therefore achieved when an AC adapter unit 72 is used as the cover member.

Embodiment 2

A printer and printer control method according to a second embodiment of the invention are described next.

Figure 13:
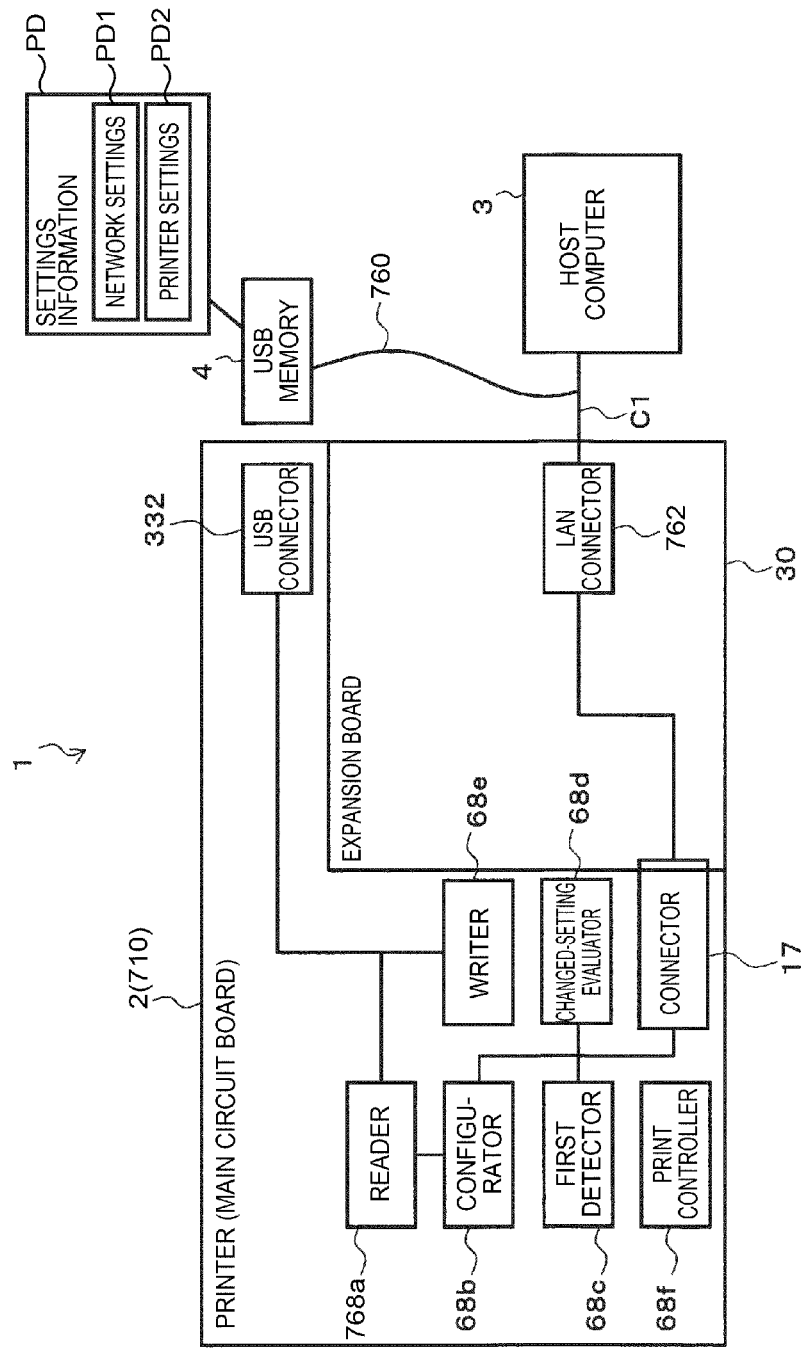
FIG. 13 is a block diagram of a functional configuration of the printer 2.

FIG. 13 is a block diagram of an example of the functional configuration of a printer 2 according to a second embodiment of the invention.

As shown in FIG. 13, the printer 2 has an expansion board 30 (first circuit board) with a network connectable LAN connector 762 (first interface), and a main circuit board 710 (second circuit board) with a connector 17 (second interface) that can connect to the expansion board 30. The printer 2 also has a USB connector 332 (third interface) to which USB memory 4 (memory) storing settings information PD (for example, network settings PD1, printer settings PD2) including network settings PD1 can connect. The printer 2 also has a first detector 68c that detects whether or not the expansion board 30 is connected to the connector 17; a reader 768a that, when the first detector 68c detects the expansion board 30 is connected to the connector 17, reads, through the USB connector 332, the settings information PD from the USB memory 4 connected to the USB connector 332; and a configurator 68b that configures settings based on the settings information PD read by the reader 768a.

This second embodiment enables even non-technical users to quickly and accurately set (transfer) the settings information PD in a printer 2 (for example, a replacement printer or new printer) having the expansion board 30 and main circuit board 710.

This is enabled by the reader 768a reading, through the USB connector 332, the settings information PD from the USB memory 4 connected to the USB connector 332, and the configurator 68b then configuring settings based on the settings information PD that was read, when the first detector 68c detects the expansion board 30 connected to the connector 17.

A printing system 1 (POS system) using the printer and printer control method of the invention are described next with reference to the figures.

Figure 12:
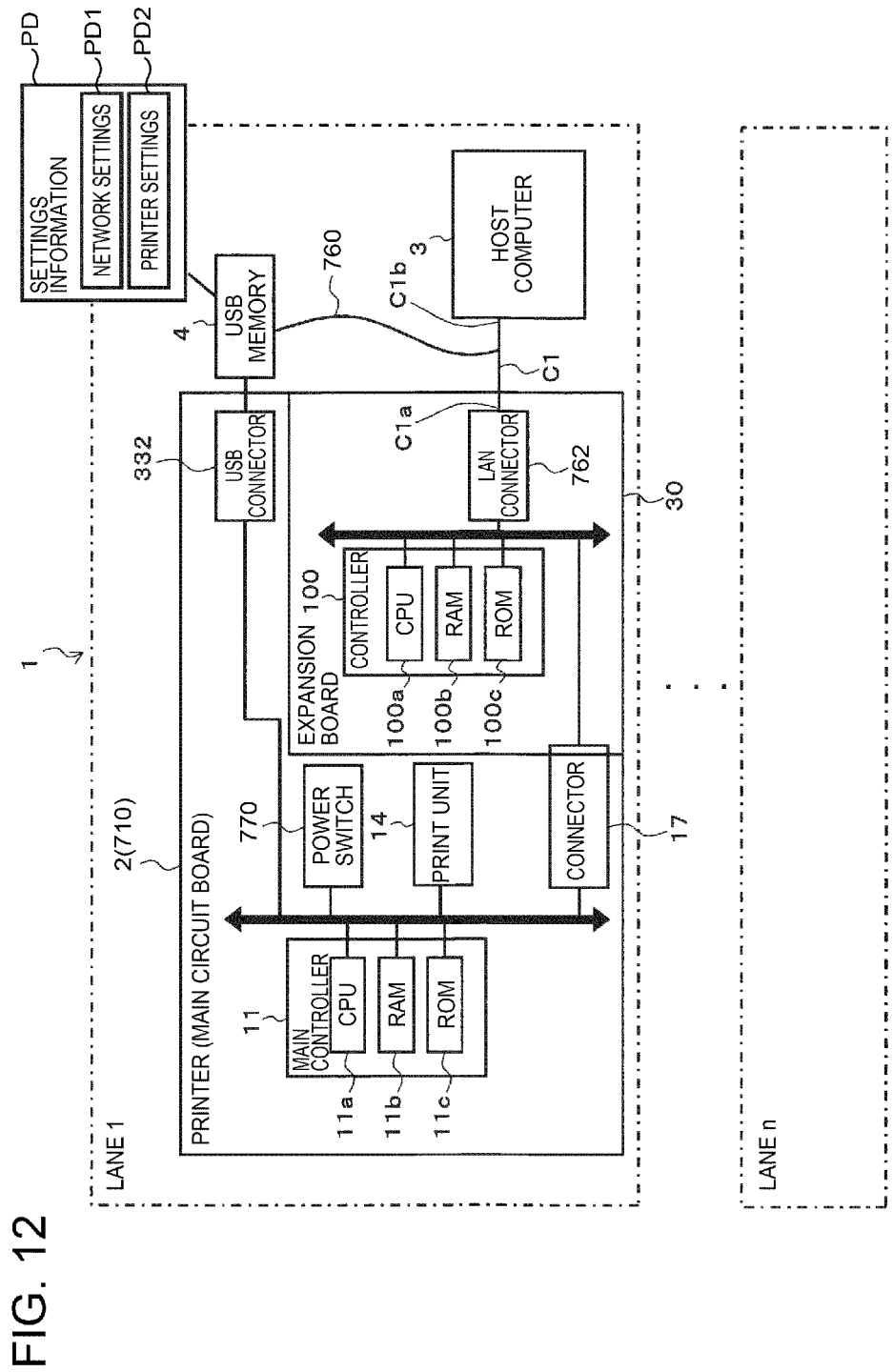
FIG. 12 illustrates the configuration of a printing system 1 in which a printer and printer control method according to the second of the invention are used.

FIG. 12 illustrates the configuration of a printing system 1 in which a printer and a printer control method according to the invention are used.

As shown in FIG. 12, the printing system 1 according to the second embodiment of the invention includes a host computer 3, USB memory 4, and printer 2 (printing device). The host computer 3, USB memory 4, and printer 2 are installed at each checkout lane (lane 1 to lane n) in a supermarket or other store.

The host computer 3 is described first.

While not shown in the figures, the hardware configuration of the host computer 3 includes a CPU and RAM, ROM, hard disk drive, and interfaces connected to the CPU through respective buses.

The printer 2 is connected to the host computer 3 through an interface. Also connected to the host computer 3 through appropriate interfaces are (not shown) a barcode reader for reading barcodes, a keyboard for inputting information including the payment amount received from a customer, for example, and a display for displaying product name and price information, for example.

The functional configuration of the host computer 3 includes functions for executing a transaction process based on input from the barcode reader and keyboard; generating print data; and communicating with the printer 2 through the LAN cable C1 (typically an Ethernet® cable). More specifically, the host computer 3 has functions for sending print data through the LAN cable C1 to the printer 2; setting the settings information PD in the printer 2; and changing the settings information PD stored in the printer 2.

These functions are embodied mainly by the host computer 3 (CPU) running specific programs read from ROM or hard disk drive to RAM (typically, the operating system, POS application, printer driver, and utility for setting or changing settings information). While not shown in the figures, the host computer 3 is connected to the store network through an interface.

USB memory 4 is described next.

USB memory 4 is, as shown in FIG. 12, physically connected by a cable connector 760 to the LAN cable C1.

Stored in USB memory 4 are settings information PD including network settings PD1. The settings information PD includes at least one of network settings information PD1 and printer settings PD2. Other information such as the printer ID and lane information is also stored on the USB memory 4.

The network settings PD1 include, for example, a fixed IP address assigned to the printer 2 (or to the lane where the printer 2 is located). The printer settings PD2 include, for example, paper width, print area, print density, printing speed, font settings, and margin settings. The printer ID is an identifier (such as the serial number) uniquely assigned to the specific printer 2. The lane information is a unique identifier assigned to the lane where the printer 2 is used.

The printer 2 is described next.

The printer 2 in this example is a receipt printer (such as a dot impact, thermal, or inkjet printer). As shown in FIG. 12, the hardware configuration of the printer 2 includes an expansion board 30, and main circuit board 710.

The expansion board 30 includes a controller 100 (first circuit board-side controller), and a network connectable LAN connector 762 connected thereto through a bus.

The controller 100 includes a CPU 100a, RAM 100b, and ROM 100c.

ROM 100c is flash ROM or other rewritable nonvolatile memory device, and has a storage area for storing network settings PD1 that are set or changed by the configurator 68b described below (or by operation of the host computer 3). Programs such as firmware (control program) are also stored in ROM 100c.

LAN connector 762 is a connected provided for connecting the printer 2 to a network (the network to which the host computer 3 is connected). The printer 2 and host computer 3 are connected by inserting one plug C1a of the LAN cable C1 to the printer 2 (762), and the other plug C1b to the host computer 3.

The main circuit board 710 includes a main controller 11 (second circuit board-side controller), and, connected thereto through a bus, connector 17, USB connector 332, power switch 770, and print unit 14 (print mechanism).

The main controller 11 includes a CPU 11a, RAM 11b, ROM 11c. ROM 11c is, for example, flash ROM or other rewritable nonvolatile memory device, and includes a storage area for storing printer settings PD2, which can be set or changed by an operation of the host computer 3 (or an operation of the printer 2).

A program such as firmware (control program), the printer ID, and lane information are stored in the ROM 11c. The printer ID and lane information are written at a specific time to USB memory 4 through the USB connector 332. The replacement history and other information about the printer 2 at each lane can be known by referencing (or printing) the printer ID and lane information written (stored) in USB memory 4.

Connector 17 is an interface to which the expansion board 30 can connect. The expansion board 30 is connected through the connector 17 to the main circuit board 710 by plugging the expansion board 30 into an expansion slot (not shown in the figure) of the printer 2. In addition to having a network-connectable interface as in this example, the expansion board 30 may also have parallel, serial, or other types of interfaces. The printer 2 can be made compatible with different interfaces by connecting an expansion board 30 with the desired interface to the main circuit board 710. The specifications of the host computer 3 to printer 2 interface can be changed by simply replacing the expansion board 30. If the print unit 14 of the printer 2 fails, for example, the printer 2 from which the expansion board 30 was removed is replaced with a replacement printer 2, and the expansion board 30 removed from the failed printer 2 can be installed in the replacement printer 2.

The USB connector 332 is an interface (such as USB Type-A) to which the USB memory 4 can connect. Note that when a USB host controller not shown is connected to the USB connector 332, the printer 2 functions as a host to the USB memory 4 when reading/writing settings information PD to the USB memory 4 connected to the USB connector 332.

Power switch 770 is a switch for supplying power to the printer 2.

The print mechanism 14 includes a printhead, paper conveyance mechanism, and paper cutting mechanism (all not shown).

As shown in FIG. 13, the functional configuration of the printer 2 includes a reader 768a, configurator 68b, first detector 68c, changed-setting evaluator 68d, writer 68e, and print controller 68f.

These functions are embodied primarily by the printer 2 (the CPU 11a of the main circuit board 710) reading and running a specific program, such as firmware, read from ROM 11c to RAM 11b.

The reader 768a reads the settings information PD from the USB memory 4 connected to the USB connector 332 through the USB connector 332 at specific times.

The specific time is, for example, when USB connector 332 and USB memory 4 are connected, the power switch 770 of the printer 2 is on, and the first detector 68c detects the expansion board 30 is connected to the connector 17.

Another specific time is, for example, when the power switch 770 of the printer 2 is on, a second detector (detection circuit 37) described below detects USB memory 4 connected to the USB connector 332, and the first detector 68c detects the expansion board 30 is connected to the connector 17.

The configurator 68b sets the network settings PD1 from the settings information PD that were read by the reader 768a on the expansion board 30, and sets the printer settings PD2 on the main circuit board 710. More specifically, the configurator 68b stores the network settings PD1 of the settings information PD read by the reader 768a in the ROM 100c of the expansion board 30, and stores the printer settings PD2 in ROM 11c of the main circuit board 710.

The first detector 68c detects if the expansion board 30 is connected to the connector 17. Various methods may be used to detect if the expansion board 30 is connected (such as the method in JP-A-2015-195038).

The changed-setting evaluator 68d determines whether or not the network settings PD1 stored in the ROM 100c of the expansion board 30, or the printer settings PD2 stored in the ROM 11c of the main circuit board 710, changed.

The writer 68e writes the settings information PD to the USB memory 4 through the USB connector 332.

For example, the writer 68e writes the new network settings PD1 to USB memory 4 through the USB connector 332 when the changed-setting evaluator 68d determines the network settings PD1 stored in the ROM 100c of the expansion board 30 changed. Likewise, when the changed-setting evaluator 68d determines the printer settings PD2 stored in the ROM 11c of the main circuit board 710 changed, the writer 68e writes the new printer settings PD2 to USB memory 4 through the USB connector 332.

The print controller 68f, based on the settings information PD received from the host computer 3 (and the printer settings PD2 stored in the ROM 11c of the main circuit board 710), controls the print unit 14 (print mechanism) to print a receipt.

Operation (a printer control method) of the printer 2 according to the second embodiment of the invention is described next with reference to FIG. 14.

Figure 14:
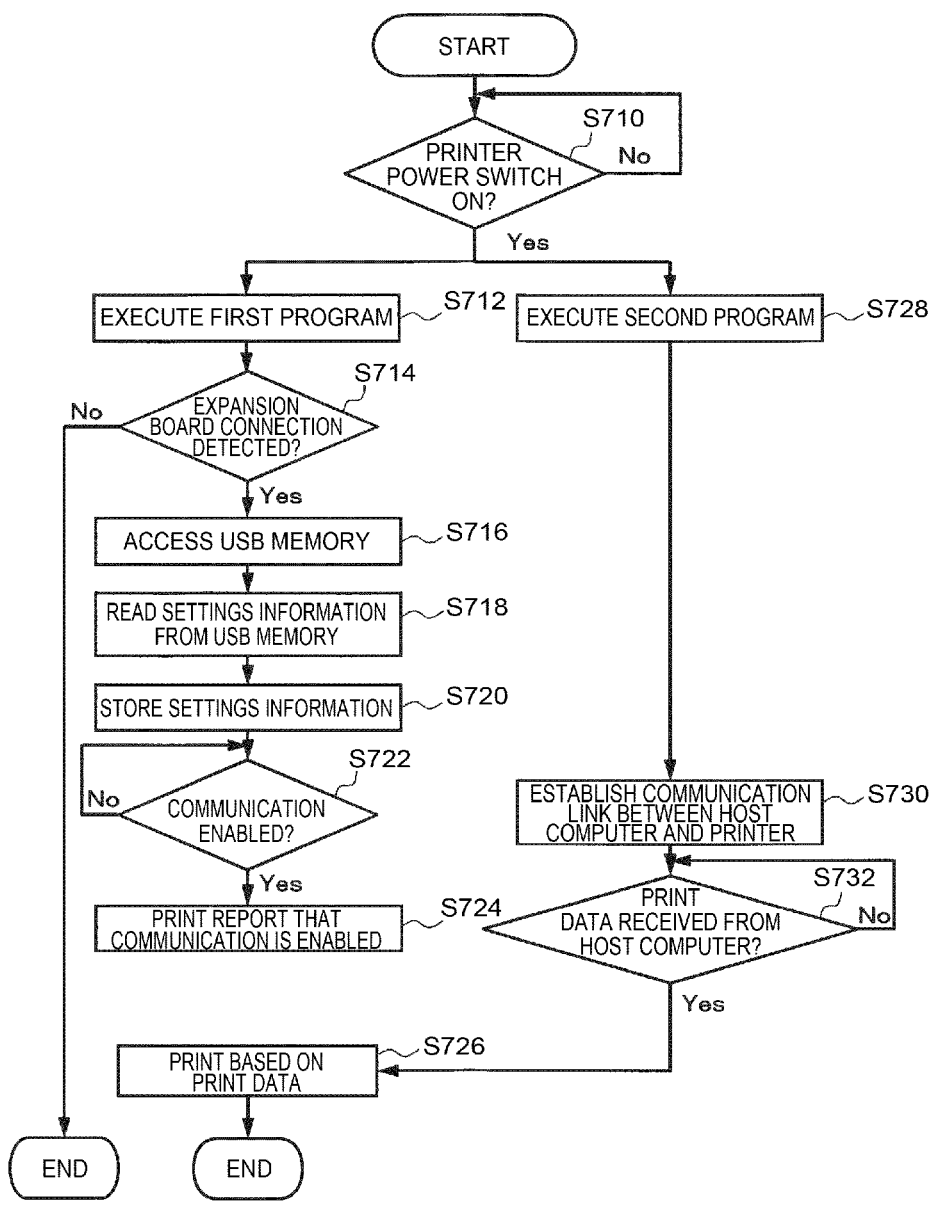
FIG. 14 is a flow chart describing the operation of the printer 2.

FIG. 14 is a flow chart of the operation of the printer 2 according to the second embodiment of the invention.

This example describes the operation executed when a printer 2 installed at a specific lane (for example, lane 1) fails in the printing system 1 shown in FIG. 12, and the failed printer 2 (referred to below as original printer 2) is replaced with a separate, normally operating printer 2 (referred to below as replacement printer 2).

The process in FIG. 14 is a process executed, for example, by the replacement printer 2.

Note that in the following operation the network settings PD1 (IP address assigned to the lane) and the printer settings PD2 are previously stored as the settings information PD in the USB memory 4. Note that the printer settings PD2 are written to USB memory 4 as a result of a process described below being executed on the original printer 2 (a process of writing the printer settings PD2 stored in the ROM 11c of the original printer 2 to USB memory 4; see FIG. 15).

When the printer 2 installed at a specific lane (for example, lane 1) fails, the original printer 2 is replaced by a store employee, for example, (referred to below as simply the employee) with the replacement printer 2 by the procedure described below before the process shown in FIG. 14 executes.

First, the employee connects the replacement printer 2 (LAN connector 762) and host computer 3. More specifically, the employee disconnects the LAN cable C1 from the original printer 2 (LAN connector 762), and connects the disconnected LAN cable C1 to the replacement printer 2 (LAN connector 762). The employee also connects the USB memory 4 to the replacement printer 2 (USE connector 332). This results in the USB memory 4 storing the settings information PD being physically connected through the cable connector 760 to the LAN cable C1 (FIG. 12). This has the following effect.

First, the employee does not need to prepare a separate external memory device every time a printer 2 is replaced.

Second, managing the USB memory 4 storing the settings information PD is easier than in the related art (for example, JP-A-2011-164872), and the employee can prepare an appropriate USB memory 4 storing the settings information PD to be set in the replacement printer 2 more quickly than in the related art.

Third, there is no chance of the employee preparing a USB memory 4 storing the incorrect settings information PD, that is, settings information PD that is different from the settings information PD that should be set in the printer 2. As a result, the correct settings information PD can be set in the replacement printer 2.

Fourth, there is no chance of the USB memory 4 being lost.

Because USB memory 4 storing settings information PD is physically connected to the LAN cable C1 by a cable connector 760, when a printer 2 is replaced, even a non-technical user can quickly and correctly set the settings information PD of the original printer 2 (for example, network settings PD1 and printer settings PD2) in the replacement printer 2.

Note that the replacement printer 2 (LAN connector 762) and host computer 3 are connected, and the replacement printer 2 (USB connector 332) and USB memory 4 are connected, while the power switch 770 of the replacement printer 2 is off.

Next, the employee turns the power switch 770 of the replacement printer 2 on.

When the power switch 770 of the replacement printer 2 turns on (step S710: Yes), the CPU 11a on the main circuit board 710 of the replacement printer 2 executes a specific program (first program) such as firmware read from ROM 11c to RAM 11b (step S712). As a result, steps step S714 to S726 are executed.

The CPU 100a on the expansion board 30 of the replacement printer 2 also executes a specific program (second program) such as firmware read from ROM 100c to RAM 100b (step S728). As a result, steps step S730 to S732 are executed.

More specifically, the first detector 68c of the main circuit board 710 first detects if the expansion board 30 was connected to the connector 17 (step S714). This is an example of a detection step of the invention.

Because the expansion board 30 is connected to the connector 17, the first detector 68c of the main circuit board 710 detects that the expansion board 30 is connected to the connector 17 (step S714: Yes).

When connection of the expansion board 30 to the connector 17 is detected (step S714: Yes), the reader 768a of the main circuit board 710 accesses USB memory 4 (step S716), and reads the settings information PD from the USB memory 4 through the USB connector 332 (step S718). This is an example of the read step of the invention.

Note that if the replacement printer 2 does not have an expansion board 30 (step S714: No), the CPU 11a aborts the process without executing this process. The CPU 11a may also report that an expansion board 30 is not present. In this event, the employee turns the power switch 770 off, removes the expansion board 30 from the original printer 2 and installs it to the replacement printer 2, and then turns the power switch 770 on again. As a result, step S710 returns Yes, step S712 executes, and step S714 returns Yes.

Because network settings PD1 (IP address assigned to the lane) and printer settings PD2 are stored as the settings information PD in the USB memory 4, the network settings PD1 and printer settings PD2 are read. Note that if configured so that at least one of network settings PD1 and printer settings PD2 is read, at least one of network settings PD1 and printer settings PD2 is read based on this setting.

As described above, the reader 768a of the main circuit board 710 reads the settings information PD from the USB memory 4 through the USB connector 332 at a specific time, which in this example is when the USB connector 332 and USB memory 4 are connected, the power switch 770 of the printer 2 is on (step S710: Yes), and the first detector 68c detects that the expansion board 30 is connected to the connector 17 (step S714: Yes).

Next, the configurator 68b of the main circuit board 710 stores the network settings PD1 from the settings information PD read by the reader 768a to the expansion board 30, and stores the printer settings PD2 to the main circuit board 710 (step S720). This is an example of a configuration step of the invention. More specifically, the configurator 68b of the main circuit board 710 stores the network settings PD1 from the settings information PD read by the reader 768a in the ROM 100c of the expansion board 30, and stores the printer settings PD2 in the ROM 11c of the main circuit board 710.

As described above, the settings information PD (network settings PD1 and printer settings PD2) are quickly and accurately set in (transferred to) the replacement printer 2.

Next, based on the network settings PD1 (IP address) set in the expansion board 30 as described above, a known process is executed to establish a communication link (such as a TCP connection) between the host computer 3 and the replacement printer 2 (step S730).

Once a communication link is established between the host computer 3 and the replacement printer 2, that is, once communication between the devices is enabled (step S722: Yes), the print controller 68f of the main circuit board 710 controls the print unit 14 (print mechanism) to print a report indicating the same (step S724). As a result, even a non-technical user can easily know by reading the printed content that configuration was completed based on the network settings PD1, and that communication with the host computer 3 is enabled.

The replacement printer 2 can then communicate through the LAN cable C1 with the host computer 3 based on the network settings PD1 (IP address) set in the replacement printer 2 (expansion board 30).

When print data is then received from the host computer 3 through the LAN cable C1 (and LAN connector 762) (step S732: Yes), the print controller 68f of the replacement printer 2, based on the received print data and the printer settings PD2 set in the replacement printer 2 (main circuit board 710), controls the print unit 14 (print mechanism) to print a receipt (step S726).

An example of a process for writing settings information PD stored in the ROM 11c of the original printer 2 (such as the printer settings PD2) to USB memory 4 is described next with reference to FIG. 15.

Figure 15:
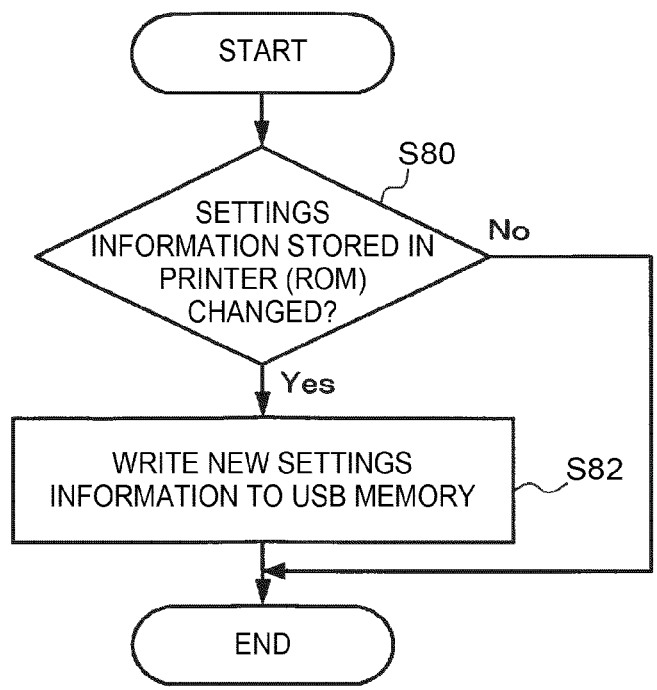
FIG. 15 is a flow chart of an example of the process writing settings information PD stored in the ROM 11c of original printer 2 to USB memory 4.

FIG. 15 is a flow chart of a process for writing settings information PD stored in the ROM 11c of the original printer 2 (such as the printer settings PD2) to USB memory 4.

The process shown in FIG. 15 is a process executed, for example, by the original printer 2 (and the replacement printer 2), primarily by the original printer 2 (CPU 11a) reading and running a specific program, such as firmware, read from ROM 11c to RAM 11b.

The printer settings PD2 stored in the ROM 11c of the original printer 2 are written to the USB memory 4 whenever any part of the printer settings PD2 change. More specifically, the printer settings PD2 are written as described below. Note that at least part of the printer settings PD2 stored in the ROM 11c of the printer 2 may be changed by an operation of the host computer 3 (or an operation of the original printer 2).

First, the original printer 2 (changed-setting evaluator 68d) determines if the printer settings PD2 stored in ROM 11c changed (step S80).

If the printer settings PD2 stored in ROM 11c changed (for example, based on an operation of the host computer 3) (step S80: Yes), the original printer 2 (writer 68e) writes the new printer settings PD2 to USB memory 4 through the USB connector 332 (step S82).

As described above, the printer settings PD2 stored in the ROM 11c of the original printer 2 are written (for example, overwritten) to the USB memory 4 whenever part of the printer settings PD2 changes. Note that the network settings PD1 stored in the ROM 100c of the original printer 2 are also written (for example, overwritten) to USB memory 4 whenever the network settings PD1 change.

As described above, the second embodiment of the invention provides a printer and a printer control method enabling even a non-technical user to quickly and correctly set (transfer) settings information PD (for example, network settings PD1 and printer settings PD2) in a printer 2 (for example, a replacement printer or a new printer) having an expansion board 30 (first circuit board) and main circuit board 710 (second circuit board), and a USB connector 332 (third interface) disposed to the main circuit board 710.

This is enabled by, when connection of the expansion board 30 to the connector 17 (second interface) is detected by the first detector 68c of the main circuit board 710 (step S714: Yes), the reader 768a reading, through the USB connector 332, the settings information PD from the USB memory 4 connected to the USB connector 332, and the configurator 68b then configuring the settings based on the settings information PD that was read.

When settings information PD is changed on the original printer 2 (changed based on an operation of the host computer 3, for example), the second embodiment also enables even a non-technical user to quickly and correctly set the new (changed) settings information PD in the replacement printer 2.

The second embodiment also enables setting settings information PD in a replacement printer 2 by the extremely simple step of an employee turning the power switch 770 of the printer 2 on when the USB memory 4 is connected to the USB connector 332.

The printer 2 in the second embodiment is a receipt printer, but the invention is not so limited and can be applied to printers other than receipt printers.

Furthermore, the printer and printer control method of the second embodiment of the invention are described using the example of a printing system 1 shown in FIG. 12 and applied to the replacement printer 2 when the printer 2 installed at a specific lane (for example, lane 1) fails and is replaced with a different normally operating printer 2, but the invention is not so limited.

For example, when a new printer 2 is installed to a specific lane (for example, lane n+1), the printer and printer control method of the invention can be applied to the newly installed printer 2.

The reader 768a in the second embodiment is described reading, through the USB connector 332, the settings information PD from the USB memory 4 connected to the USB connector 332 (step S718) at a specific time, which in this example is when the power switch 770 of the printer 2 turns on (step S710: Yes), but the invention is not so limited.

For example, the reader 768a may read the settings information PD from the USB memory 4 through the USB connector 332 at a different specific time, such as when the USB memory 4 is connected to the USB connector 332 while the power switch 770 of the replacement printer 2 is on. Note that whether or not USB memory 4 is connected to the USB connector 332 is detected by a detection circuit 37 described below, for example.

An IP address is used as an example of the network settings PD1 in the second embodiment, but the invention is not so limited and a different network address may be used as the network settings PD1.

In the second embodiment, the reader 768a, configurator 68b, first detector 68c, changed-setting evaluator 68d, writer 68e, and print controller 68f are embodied by the CPU 11a of the main circuit board 710 executing a first program, but the invention is not so limited.

For example, one or more of the reader 768a, configurator 68b, first detector 68c, changed-setting evaluator 68d, writer 68e, and print controller 68f may be embodied by the CPU 100a of the expansion board 30 executing a second program.

Furthermore, in the second embodiment, a LAN connector 762 is used as the first interface, and a connector 17 is used as the second interface, but the invention is not so limited and other suitable interfaces may be used.

Also in the second embodiment, a USB connector 332 is used as a third interface, but the invention is not so limited and a serial interface, parallel interface, or other type of interface may be used.

Variation 2

A printer 2A according to a second variation is described below with reference to the figures.

Figure 16:
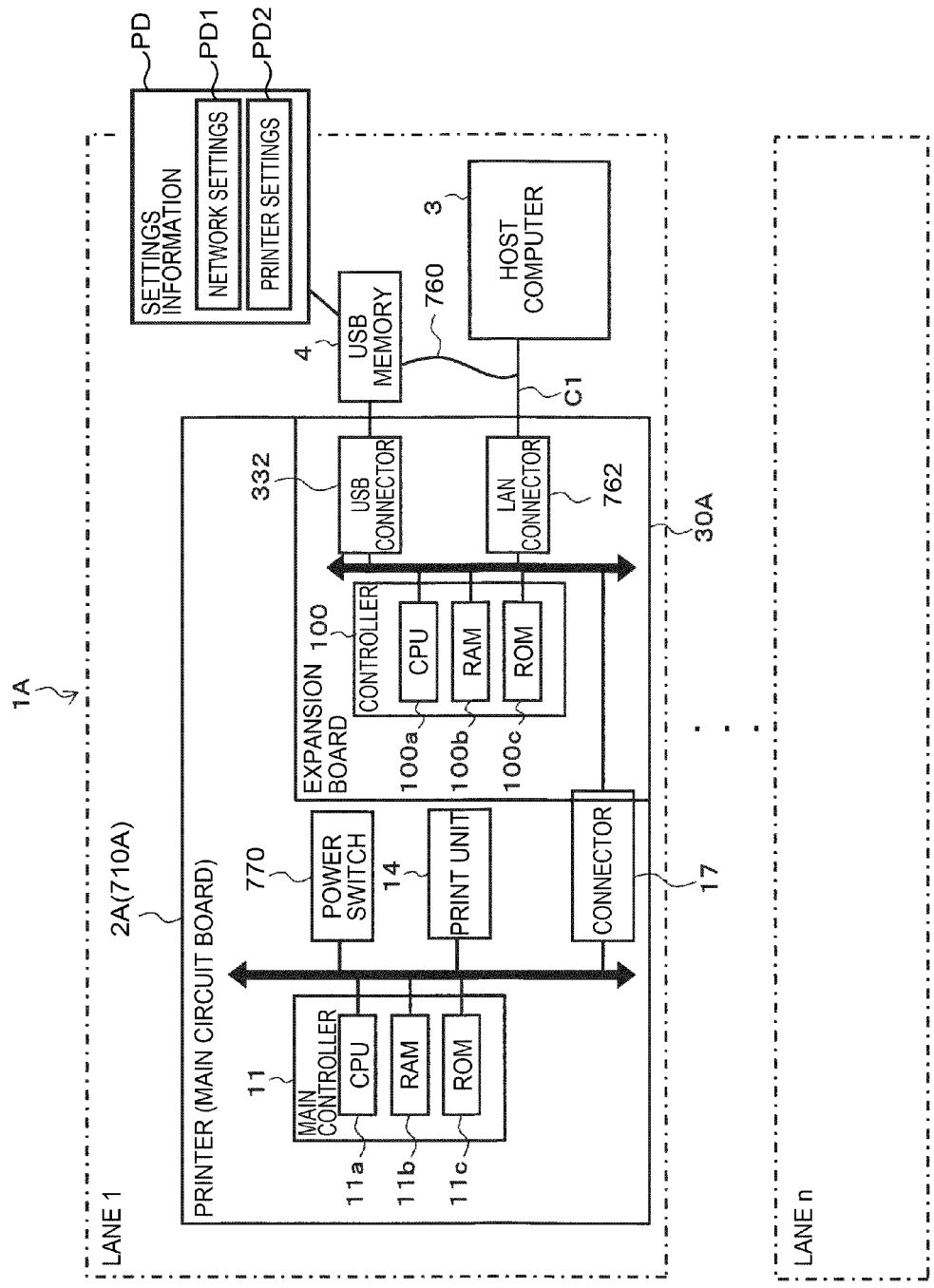
FIG. 16 shows an example of the system configuration of a printer 2A according to a second variation.

FIG. 16 illustrates the configuration of a printing system 1 including a printer 2A according to a second variation.

As shown in FIG. 16, the printer 2A according to the second variation differs from the printer 2 of the second embodiment in that the USB connector 332 is on the expansion board 30A, and is otherwise the same as the printer 2 of the second embodiment. This printer 2A is described focusing on the differences with the printer 2 of the second embodiment, like parts are referenced by like reference numerals, and further description thereof is omitted below.

Figure 17:
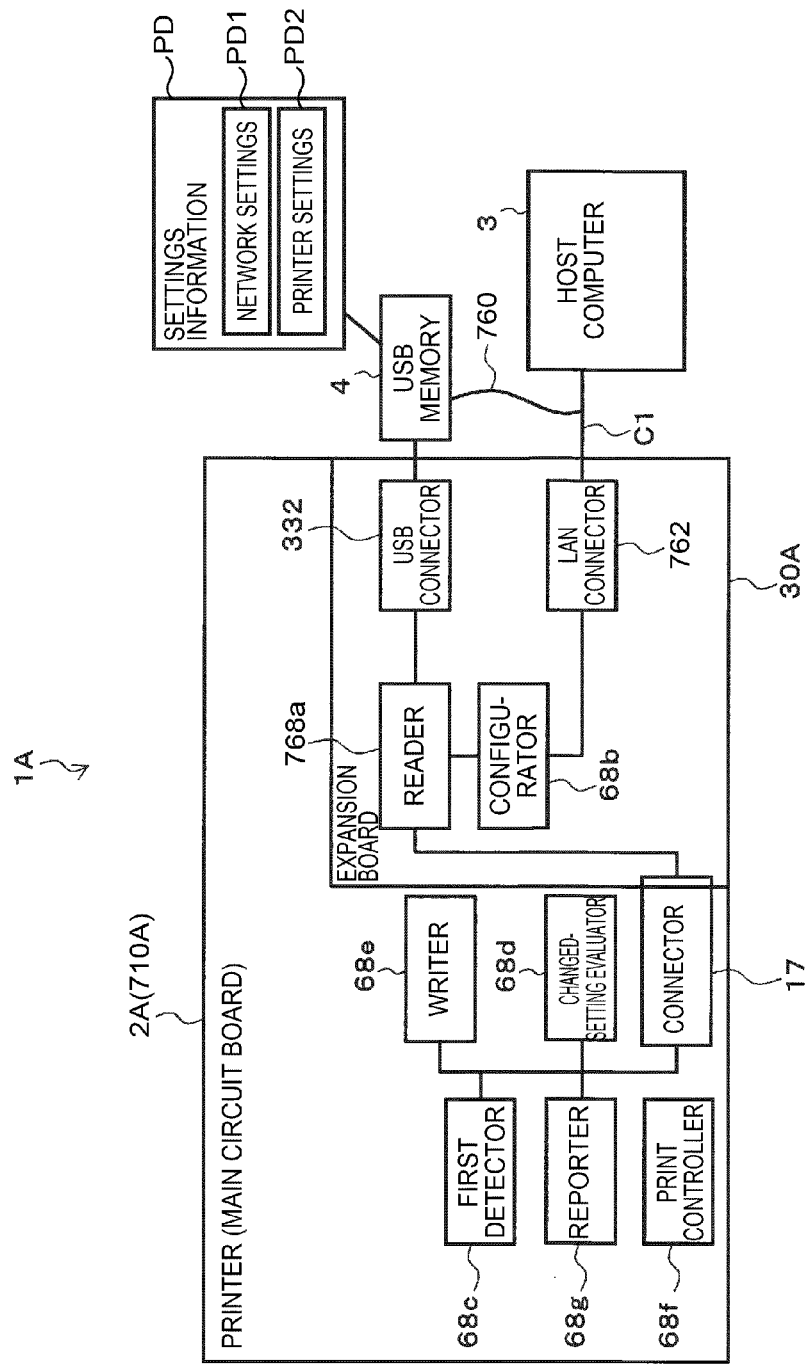
FIG. 17 is a block diagram of an example of the functional configuration of the printer 2A according to the second variation.

FIG. 17 is a block diagram illustrating the functional configuration of the printer 2A of the second variation.

As shown in FIG. 17, the functional configuration of the main circuit board 710A side of the printer 2A of the second variation includes a reporter 68g in addition to the first detector 68c, changed-setting evaluator 68d, writer 68e, and print controller 68f. These functions are embodied primarily by the CPU 11a (second circuit board-side controller) on the main circuit board 710A side reading and running a specific program (first program), such as firmware, read from ROM 11c to RAM 11b.

The reporter 68g, when the first detector 68c detects connection of the expansion board 30A to the connector 17, reports the detection result through the connector 17 to the CPU 100a expansion board 30A side.

The first detector 68c, changed-setting evaluator 68d, writer 68e, and print controller 68f are the same as in the second embodiment, and further description thereof is omitted.

The functional configuration on the expansion board 30A side of the printer 2A of the second variation includes a reader 768a, and configurator 68b. These functions are embodied primarily by the CPU 100a (first circuit board-side controller) on the expansion board 30A side reading and running a specific program (second program), such as firmware, read from ROM 100c to RAM 100b.

The reader 768a reads the settings information PD from the USB memory 4 connected to the USB connector 332 through the USB connector 332 at specific times.

The specific time is, for example, when USB connector 332 and USB memory 4 are connected, the power switch 770 of the printer 2A is on, and the detection result (indicating that the expansion board 30A was connected to the connector 17) is reported by the reporter 68g.

Another specific time is, for example, when the power switch 770 of the printer 2A is on, a second detector (detection circuit 37) described below detects USB memory 4 connected to the USB connector 332, and the detection result (indicating that the expansion board 30A is connected to the connector 17) is reported by the reporter 68g.

The configurator 68b is the same as in the second embodiment, and further description thereof is omitted.

Operation (a printer control method) of the printer 2A according to the second variation is described next with reference to FIG. 18.

Figure 18:
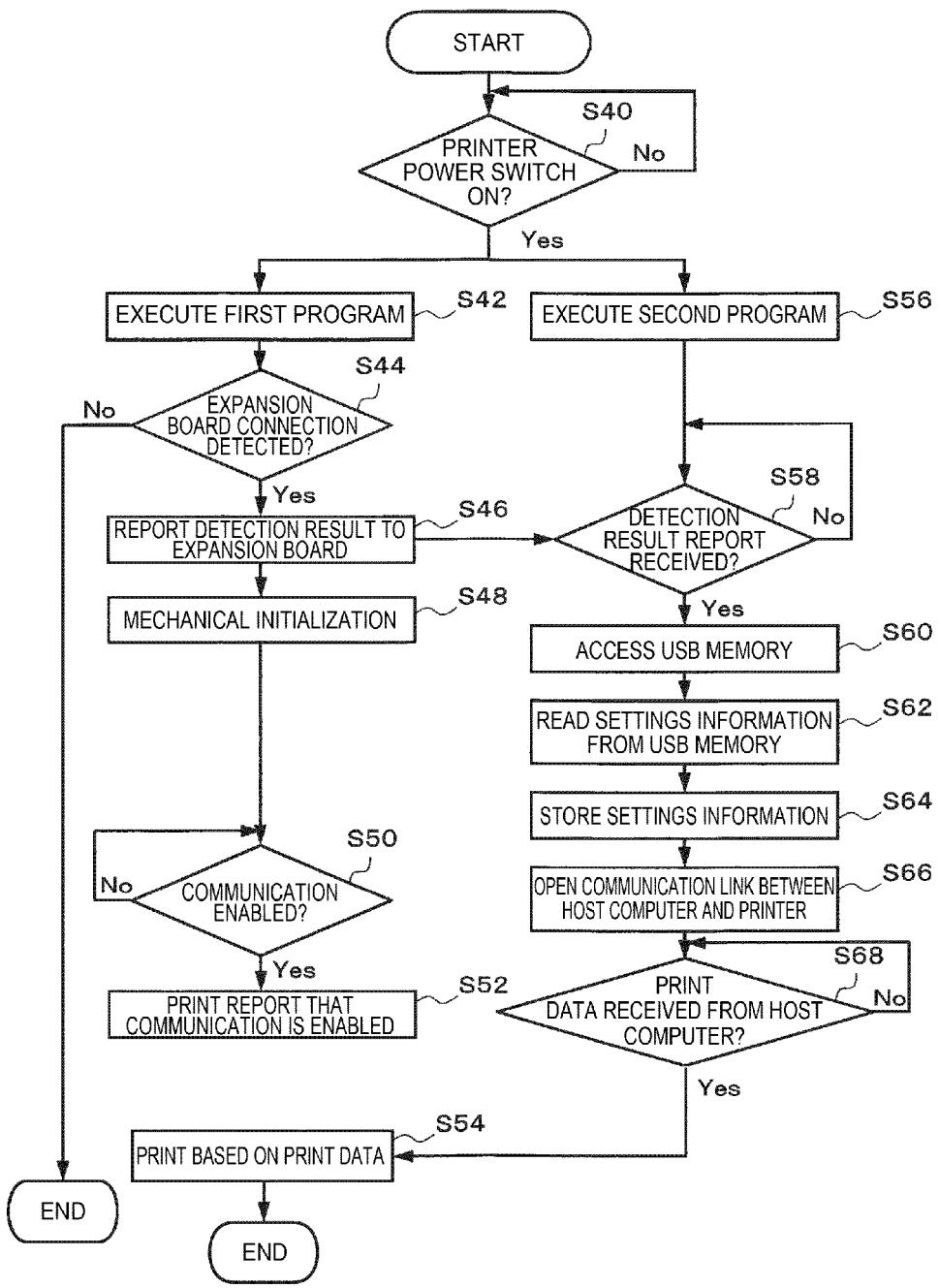
FIG. 18 is a flowchart describing an example of the operation of the printer 2A according to the second variation.

FIG. 18 is a flow chart of the operation of the printer 2A of the second variation.

This example describes the operation executed when a printer 2A installed at a specific lane (for example, lane 1) fails in the printing system 1A shown in FIG. 16, and the failed printer 2A (referred to below as original printer 2A) is replaced with a separate, normally operating printer 2A (referred to below as replacement printer 2A).

The process in FIG. 18 is a process executed, for example, by the replacement printer 2A.

Note that in the following operation the network settings PD1 (IP address assigned to the lane) and the printer settings PD2 are previously stored as the settings information PD in USB memory 4. Note that the printer settings PD2 are written to USB memory 4 as a result of a process of the process described in FIG. 15 being executed on the original printer 2A (a process of writing the printer settings PD2 stored in the ROM 11c of the original printer 2A to USB memory 4).

When the printer 2A installed at a specific lane (for example, lane 1) fails, the original printer 2A is replaced by a store employee with the replacement printer 2 by the procedure of the second embodiment described above before the process in FIG. 18 executes.

Next, the employee turns the power switch 770 of the replacement printer 2A on.

When the power switch 770 of the replacement printer 2A turns on (step S40: Yes), the CPU 11a on the main circuit board 710A of the replacement printer 2A executes a specific program (first program) such as firmware read from ROM 11c to RAM 11b (step S42). As a result, steps S44 to S54 execute.

The CPU 100a on the expansion board 30A of the replacement printer 2A also executes a specific program (second program) such as firmware read from ROM 100c to RAM 100b (step S56). As a result, steps step S58 to S68 execute.

More specifically, the first detector 68c of the main circuit board 710A first detects if the expansion board 30A was connected to the connector 17 (step S44).

Because the expansion board 30A is connected to the connector 17, the first detector 68c of the main circuit board 710A detects that the expansion board 30A is connected to the connector 17 (step S44: Yes).

When connection of the expansion board 30A to the connector 17 is detected (step S44: Yes), the reporter 68g sends the detection result through the connector 17 to the CPU 100a (first circuit board-side controller) on the expansion board 30A (step S46).

Next, when the detection result report is received from the main circuit board side (step S58: Yes), the reader 768a of the expansion board 30A accesses USB memory 4 (step S60), and reads the settings information PD from USB memory 4 through the USB connector 332 (step S62).

Because network settings PD1 (IP address assigned to the lane) and printer settings PD2 are stored as the settings information PD in USB memory 4, the network settings PD1 and printer settings PD2 are read. Note that if configured so that at least one of network settings PD1 and printer settings PD2 is read, at least one of network settings PD1 and printer settings PD2 is read based on this setting.

As described above, the reader 768a reads the settings information PD from the USB memory 4 through the USB connector 332 at a specific time, which in this example is when the USB connector 332 and USB memory 4 are connected, the power switch 770 of the printer 2A is on (step S40: Yes), and a detection result indicating that the expansion board 30A is connected to the connector 17 is reported by the reporter 68g (step S58: Yes).

Next, the configurator 68b of the expansion board 30A stores the network settings PD1 from the settings information PD read by the reader 768a to the expansion board 30A, and stores the printer settings PD2 to the main circuit board 710A (step S64). More specifically, the configurator 68b stores the network settings PD1 from the settings information PD read by the reader 768a in the ROM 100c of the expansion board 30A, and stores the printer settings PD2 in the ROM 11c of the main circuit board 710A.

As described above, the settings information PD (network settings PD1 and printer settings PD2) are quickly and accurately set in (transferred to) the replacement printer 2A.

As described above, while the processes of the reader 768a and configurator 68b on the expansion board 30A side (steps S60 to S64) are executing, the main controller 11 (second circuit board-side controller) on the main circuit board 710A side can execute other processes such as mechanical initialization (step S48). More specifically, the processes of the controller 100 (first circuit board-side controller) (processes of the reader 768a and configurator 68b; steps S60 to S64), and the processes of the main controller 11 (second circuit board-side controller) (for example, mechanical initialization; step S48), are executed in parallel.

Next, based on the network settings PD1 (IP address) set in the expansion board 30A as described above, a known process is executed to establish a communication link (such as a TCP connection) between the host computer 3 and the replacement printer 2A (step S66).

Once a communication link is established between the host computer 3 and the replacement printer 2A, that is, once communication between the devices is enabled (step S50: Yes), the print controller 68f of the main circuit board 710A controls the print unit 14 (print mechanism) to print a report indicating the same (step S52). As a result, even a non-technical user can easily know by reading the printed content that configuration was completed based on the network settings PD1, and that communication with the host computer 3 is enabled.

The replacement printer 2A can then communicate through the LAN cable C1 with the host computer 3 based on the network settings PD1 (IP address) set in the replacement printer 2A (expansion board 30A).

When print data is then received from the host computer 3 through the LAN cable C1 (and LAN connector 762) (step S68: Yes), the print controller 68f of the replacement printer 2A, based on the received print data and the printer settings PD2 set in the replacement printer 2A (main circuit board 710A), controls the print unit 14 (print mechanism) to print a receipt (step S54).

As described above, this second variation provides a printer and a printer control method enabling even a non-technical user to quickly and correctly set (transfer) settings information PD (for example, network settings PD1 and printer settings PD2) in a printer 2A (for example, a replacement printer or a new printer) having an expansion board 30A and main circuit board and a USB connector 332 disposed to the main expansion board 30A.

The second variation also enables parallel execution of processes executed by the controller 100 (first circuit board-side controller) (processes of the reader 768a and configurator 68b; steps S60 to S64), and other processes executed by the main controller 11 (second circuit board-side controller) (for example, mechanical initialization; step S48).

Variation 3

A printer 2B according to a third variation is described below with reference to the figures.

Figure 19:
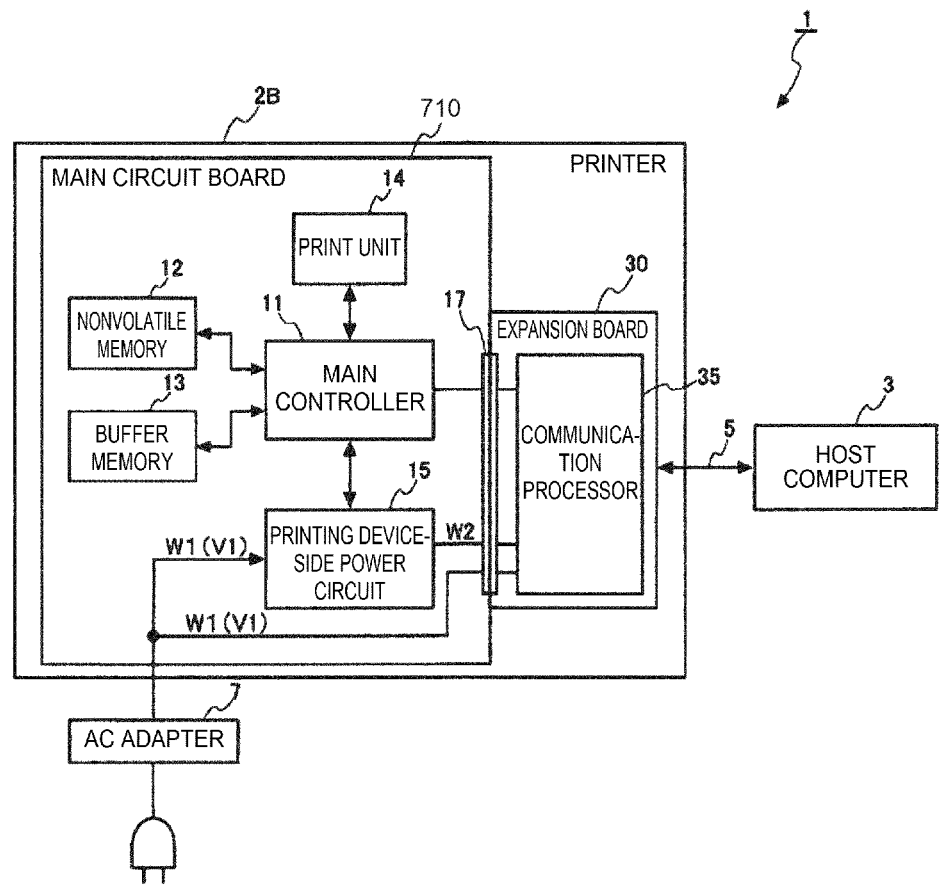
FIG. 19 illustrates the configuration a printing system including a printer 2B according to a third variation.
Figure 20:
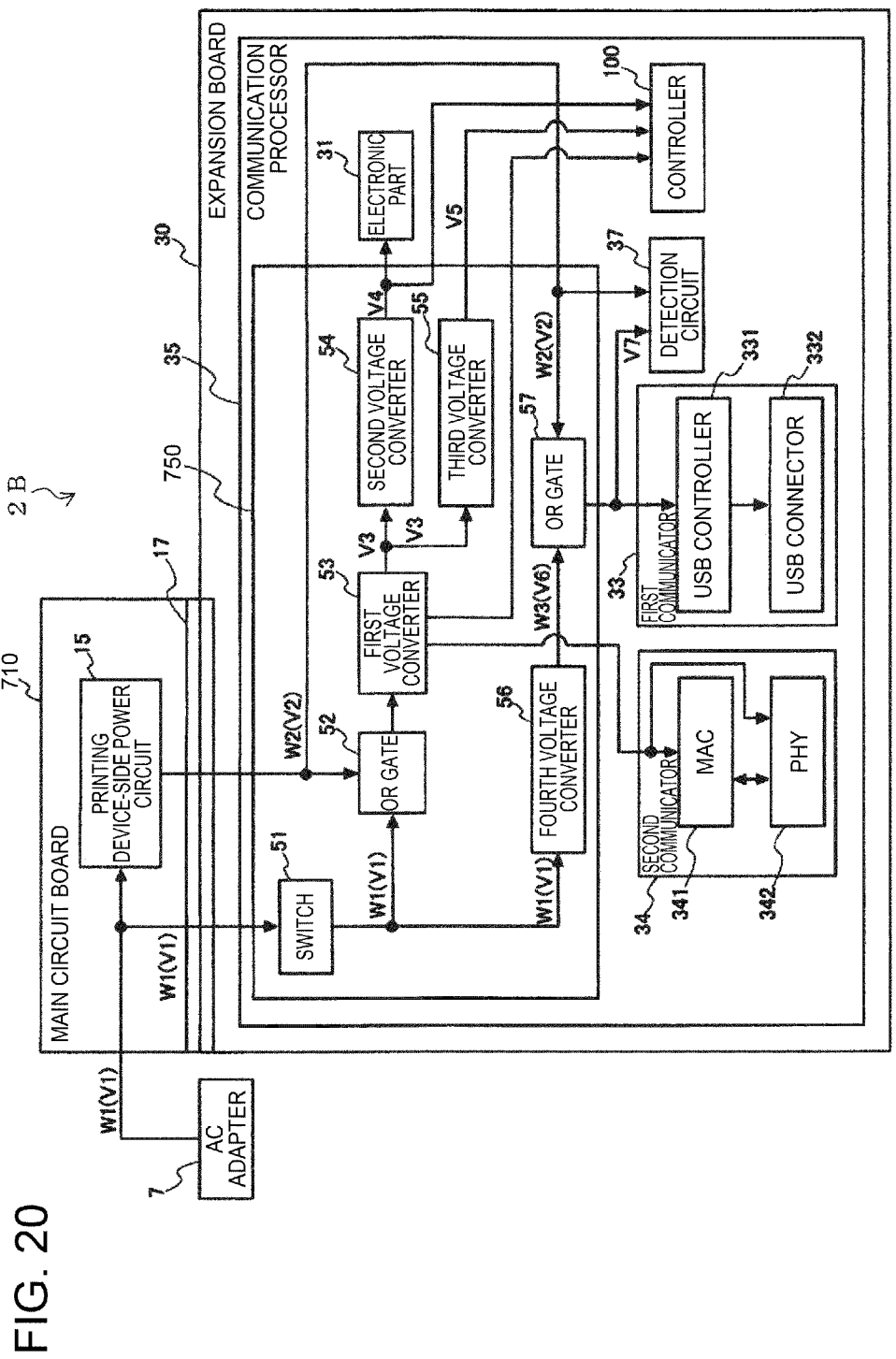
FIG. 20 illustrates the configuration of an expansion board.

FIG. 19 and FIG. 20 illustrate the configuration of a printing system 1 including a printer 2B according to this third variation.

The printer 2B of the third variation differs from the printer 2A of the second variation by the addition of a power conservation mode, and is otherwise the same as the printer 2A of the second variation. This printer 2B is described focusing on the differences with the printer 2A of the second variation, like parts are referenced by like reference numerals, and further description thereof is omitted below.

The printer 2B of the third variation has a power supply unit (such as the AC adapter 7 and printer-side power circuit 15 described below) capable of supplying DC power W1 (first power; for example, 24 V, 100 mA), or DC power W2 that is lower than DC power W1 (second power; for example, 5 V, 100 mA), from the main circuit board 710 through the connector 17 to the expansion board 30.

The printer 2B also has second detector (for example, detection circuit 37 described below) for detecting whether or not USB memory 4 (memory) is connected to the USB connector 332 (third interface); and a selector (for example, switch 51 and OR gate 52 as described below) for switching the power supplied from the power supply unit through the connector 17 between DC power W2 and DC power W1.

When DC power W2 is supplied through the connector 17, and the second detector (for example, detection circuit 37) detects that USB memory 4 is connected to the USB connector 332, the selector (for example, switch 51, OR gate 52) switches the power supplied through the connector 17 from DC power W2 to DC power W1.

The printer 2B of the third variation is further described below with particular reference to the configuration enabling a power conservation mode. Note that below the printer 2 is referred to as printing device 2, and USB memory 4 is referred to as a USB device.

As shown in FIG. 19, the printing system 1 includes a printing device 2, and a host computer 3 that communicates with the printing device 2 and causes the printing device 2 to print. The printing device 2 and host computer 3 are communicatively connected through an Ethernet® network 5.

An application for generating print data, and a printer driver, are installed on the host computer 3. Triggered by a user command, the host computer 3 generates information about the images and text for the printing device 2 to print. Based on the generated image and text information, the host computer 3 generates control data in a command language the printing device 2 can interpret. The host computer 3 then sends the generated control data through the network 5 to the printing device 2. The printing device 2 then prints images on printing paper based on the control data received from the host computer 3.

The printing device 2 has a main circuit board 710, and an expansion board 30.

The main circuit board 710 is populated with a main controller 11, nonvolatile memory 12, buffer memory 13, print unit 14, and printing device-side power circuit 15.

The main controller 11 controls the printing operation as the print engine, and controls other parts of the printing device 2.

Nonvolatile memory 12 stores programs executed by the main controller 11, and data.

Buffer memory 13 temporarily stores data received from the host computer 3.

Print unit 14 comprises hardware for printing on printing paper as controlled by the main controller 11.

The printing device-side power circuit 15 connects to the AC adapter 7, which converts AC power to DC power W1. The printing device-side power circuit 15 converts the voltage V1 of the DC power W1 (for example, 24 V, 100 mA) input from the AC adapter 7 to voltage V2 (for example, 5 V). The printing device-side power circuit 15 supplies the voltage-converted DC power W2 (for example, 5 V, 100 mA; second power) to the main circuit board 710. The printing device-side power circuit 15 also supplies DC power W2 to the expansion board 30. The expansion board 30 thus receives DC power W1 supplied from the AC adapter 7.

The main circuit board 710 has a connector 17, and the expansion board 30 is removably connected through the connector 17 to the main circuit board 710. The expansion board 30 is an expansion board enabling the main controller 11 of the main circuit board 710 to exchange data with the host computer 3, and has a communication processor 35.

FIG. 20 illustrates the configuration of the expansion board 30.

The communication processor 35 of the expansion board 30 has a power supply unit 750, electronic part 31, first communicator 33, second communicator 34, detection circuit 37 (second detector), and controller 100.

The power supply unit 750 has a switch 51, OR gate 52, first voltage converter 53, second voltage converter 54, third voltage converter 55, fourth voltage converter 56, and OR gate 57.

The first communicator 33 includes a USB controller 331 (USB host controller, referred to below as USB controller 331), and USB connector 332.

The second communicator 34 includes a MAC (Media Access Controller) 341, PHY (Physical Layer) 342, and a LAN connector (first interface) not shown.

Switch 51, as controlled by the controller 100, controls input of DC power W1 from the AC adapter 7 to the power supply unit 750. When the controller 100 turns switch 51 off, the current supply to the power supply unit 750 is interrupted. As a result, the supply of DC power W1 to the power supply unit 750 is interrupted.

OR gate 52 outputs the DC power W2 supplied from the printing device-side power circuit 15 to the first voltage converter 53. When switch 51 is on and DC power W1 is supplied from the AC adapter 7, OR gate 52 outputs the supplied DC power W1 to the first voltage converter 53. In other words, when switch 51 is on, OR gate 52 outputs both DC power W1 and W2 to the first voltage converter 53.

First voltage converter 53, second voltage converter 54, third voltage converter 55, and fourth voltage converter 56 are configured by DC-DC converters. Various circuits, such as a linear regulator, chopper circuit, and switching regulator, are used in a DC-DC converter.

When switch 51 is on and DC power W1 and W2 are input through the OR gate 52, the first voltage converter 53, using voltage V1 of DC power W1, voltage converts voltage V1, and generates voltage V3 (for example, 3.3 V), which is the system power supply. The first voltage converter 53 may also voltage convert voltage V2 to generate voltage V3.

When switch 51 is off and the supply of DC power W1 is interrupted, the first voltage converter 53 voltage converts voltage V2 of DC power W2, and generates voltage V3.

The first voltage converter 53 outputs the generated voltage V3 to controller 100, second communicator 34, second voltage converter 54 and third voltage converter 55. Using voltage V3, the controller 100 communicates with the second communicator 34. The second communicator 34 operates with voltage V3 as the drive voltage.

The second voltage converter 54 voltage converts the voltage V3 input from the first voltage converter 53, and generates voltage V4 (for example, 1.5 V). The second voltage converter 54 supplies the generated voltage V4 to electronic part 31. Included in the electronic part 31 is, for example, DRAM or other memory storing data. The second voltage converter 54 also supplies the generated voltage V4 to the controller 100. The controller 100, using voltage V4, writes data to memory as the electronic part 31, and reads data from memory.

The third voltage converter 55 voltage converts the voltage V3 input from first voltage converter 53 to generate voltage V5 (for example, 1.1V). The third voltage converter 55 supplies the generated voltage V5 to the controller 100. The controller 100 operates using the voltage V5 supplied from the third voltage converter 55.

The fourth voltage converter 56 voltage converts (steps down) the voltage V1 of the DC power W1 input from the AC adapter 7 to generate DC power W3 of voltage V6 (for example, 5V), 550 mA, and outputs the generated DC power W3 to the OR gate 57.

When DC power W2 is input from the printing device-side power circuit 15, and switch 51 is on, DC power W3 is also input from the fourth voltage converter 56 to OR gate 57.

OR gate 57 outputs the DC power W2 input from the printing device-side power circuit 15 to USB controller 331. When switch 51 is on and DC power W3 is input from the fourth voltage converter 56, OR gate 57 outputs the input DC power W3 to the USB controller 331. When switch 51 is on, OR gate 57 outputs DC power W3 and W2 to the USB controller 331.

A current limiter (not shown in the figure) is disposed between OR gate 57 and the USB controller 331. The current limiter limits the current of the DC power W3 supplied from the fourth voltage converter 56 to the USB controller 331 from 550 mA to 500 mA.

USB controller 331 is connected to USB connector 332, and enables bidirectional data communication by USB with the USB device connected to the USB connector 332 as controlled by the controller 100.

When switch 51 is on, DC power W4 (first power) of voltage V6 (5 V), 500 mA, and DC power W2 of voltage V2 (5 V), 100 mA, are supplied to the USB controller 331. The DC power W2 supplied from the printing device-side power circuit 15 is lower than DC power W6 supplied from the fourth voltage converter 56.

The USB controller 331 uses DC power W4 and W2 as the drive voltage of the first communicator 33. When a USB device is connected to USB connector 332, USB controller 331 supplies DC power W4 to USB connector 332. More specifically, USB controller 331 applies voltage V6 (5 V) to a pin (VBUS) of the USB connector 332 connected to the power line (VBUS) of the USB cable connected to the USB device, and supplies DC power W4 to the USB device.

When switch 51 is off, DC power W2 of voltage V2 (5 V), 100 mA is supplied to USB controller 331. USB controller 331 uses this DC power W2 as the drive voltage of the first communicator 33.

When a USB device is connected to USB connector 332 through a USB cable, USB controller 331 applies voltage V2 (5 V) to the VBUS pin of USB connector 332, and supplies DC power W2 to the USB device. USB controller 331 applies voltage V2 to the VBUS pin of USB connector 332 even when a USB device is not connected to the USB connector 332. This voltage is for compatibility when a USB device that operates using USB bus power is connected to USB connector 332.

USB connector 332 is a connector for connecting a USB device to USB controller 331. USB connector 332 has four output pins, a VBUS pin to which a 5 V voltage is connected, GND pin, and D+ and D-data line pins.

MAC 341 is a controller for Ethernet data link layer processes, divides data into packets according to the network 5 standard, and assembles data from packets received through the network 5.

PHY 342 is a controller that handles the Ethernet physical layer. PHY 342 converts encoded data to signals according to the signal standard of the communication cable, and encodes received signals. PHY 342 also monitors the network 5, and detects states in which control data packets related to printing are not received for a previously set time as a LPI (Low Power Idle) state. When a LPI state is detected, PHY 342 outputs a signal indicating that a LPI state was detected (referred to below as the first detection signal) to the controller 100. If receipt of a control data packet is detected after outputting the first detection signal to the controller 100, PHY 342 outputs a signal reporting receiving a packet (referred to below as the second detection signal) to the controller 100.

The controller 100 controls function units on the expansion board 30 to enable communication by Ethernet and communication by USB.

The operating modes of the communication processor 35 including a normal mode (first mode) and a power conservation mode (second mode). In the normal mode, there is no limit to the power supply to any of the components on the expansion board 30, and is a mode in which all components on the expansion board 30 are being driven or can be driven. In the normal mode, the controller 100 turns switch 51 on and supplies DC power W1 to the power supply unit 750.

In the power conservation mode, the power supply to some components on the expansion board 30 is limited, and is a mode that reduces power consumption by the expansion board 30. When PHY 342 detects a LPI state, for example, the controller 100 applies LPI control as defined in IEEE 802.az to stop the power supply to the MAC 341, which is a layer above the PHY 342.

In the power conservation mode, the controller 100 turns switch 51 on, stops supplying DC power W1 to the power supply unit 750, and reduces power consumption by the communication processor 35. By the supply of DC power W1 to the power supply unit 750 stopping, the power supply unit 750 generates the voltage V3 (3.3 V) required as the system power supply, and the voltage applied to the VBUS pin of the USB connector 332, based on the DC power W2 supplied from the printing device-side power circuit 15 of the main circuit board 710.

In the power conservation mode, the controller 100 also operates at a clock rate of a lower operating frequency than the operating clock in the normal mode.

The detection circuit 37 (second detector) is a circuit that detects connection of a USB device to the USB connector 332.

The current required for a USB device that operates using power supplied from the first communicator 33 differs according to the USB device. For example, devices such as a hard disk drive or scanner with relatively high current consumption require approximately 500 mA. The USB controller 331 must therefore recognize the USB device connected to the USB connector 332. However, if a USB device such as a wireless converter that uses only the VBUS and GND power supply lines and does not use the D+ and D− signal lines is connected, the USB controller 331 cannot recognize what type of device was connected.

Because the power supplied to the USB controller 331 in the power conservation mode is DC power W2, which is lower than DC power W4, the USB device may not be correctly recognized or operation may be unstable, or the controller 100 may shut down, if the current supplied to the USB device is insufficient.

When the controller 100 is in the power conservation mode, the detection circuit 37 detects connection of a USB device to the USB connector 332 and outputs an interrupt signal to the controller 100. When the interrupt signal is input, the controller 100 wakes from the power conservation mode and turns switch 51 on. As a result, the supply of DC power W1 from the AC adapter 7 to the power supply unit 750 is resumed, and the 5-V, 500-mA DC power W4 is supplied to the USB controller 331.

Figure 21:
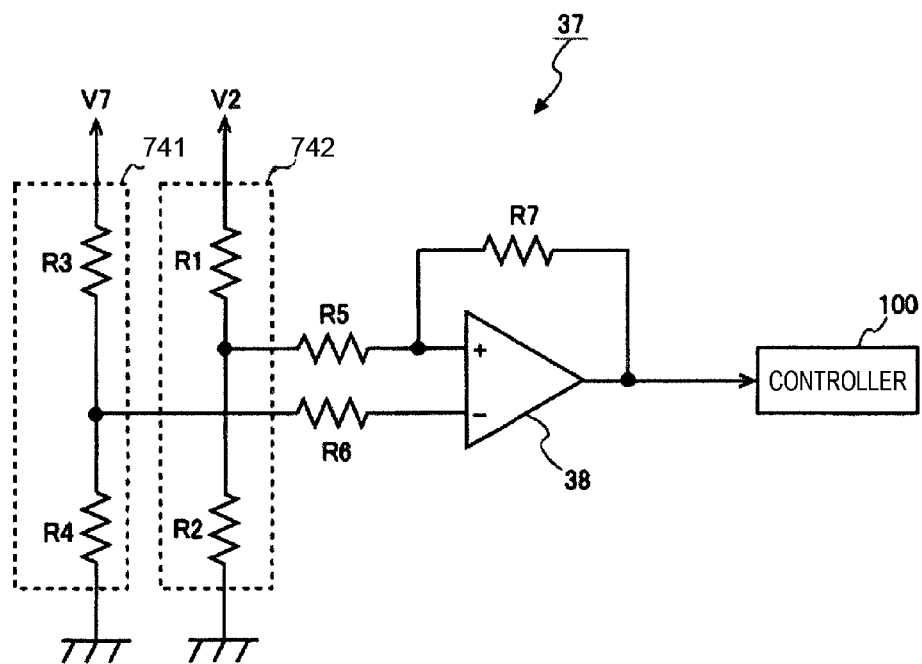
FIG. 21 illustrates the configuration of a detection circuit.

FIG. 21 shows the configuration of the detection circuit 37.

The detection circuit 37 is a hysteresis comparator with an operating amplifier 38. Resistance R5 is connected to the non-inverting input node of the operating amplifier 38, and resistance R6 is connected to inverting input node of the operating amplifier 38. A resistance R7 is connected between the output node and the non-inverting input node of the operating amplifier 38.

A voltage divider 742 with resistance R1 and resistance R2 connected in series is connected to the opposite end of resistance R5 connected to the non-inverting input node of the operating amplifier 38. Voltage divider 742 divides the voltage V2 supplied from the printing device-side power circuit 15, and outputs to the non-inverting input node of the operating amplifier 38.

A voltage divider 741 with resistance R3 and resistance R4 connected in series is connected to the opposite end of resistance R6 connected to the inverting input node of the operating amplifier 38. Voltage divider 741 divides the voltage V7 output from OR gate 57, and outputs to the inverting input node of the operating amplifier 38.

The output node of the operating amplifier 38 is connected to controller 100.

Voltage V7, which is the output voltage of OR gate 57, is a voltage that is not supplied only to the detection circuit 37, but is supplied to multiple devices, such as the step-up node of the DC-DC converter. As a result, voltage V7 is a lower voltage than voltage V2. Furthermore, when a USB device with a high load is connected to USB connector 332, voltage V7 drops before voltage V2 by the voltage supplied to multiple devices.

The detection circuit 37 outputs an interrupt signal to the controller 100 if the difference between voltage V2 as the reference voltage and voltage V7 exceeds a previously set threshold.

Figure 22:
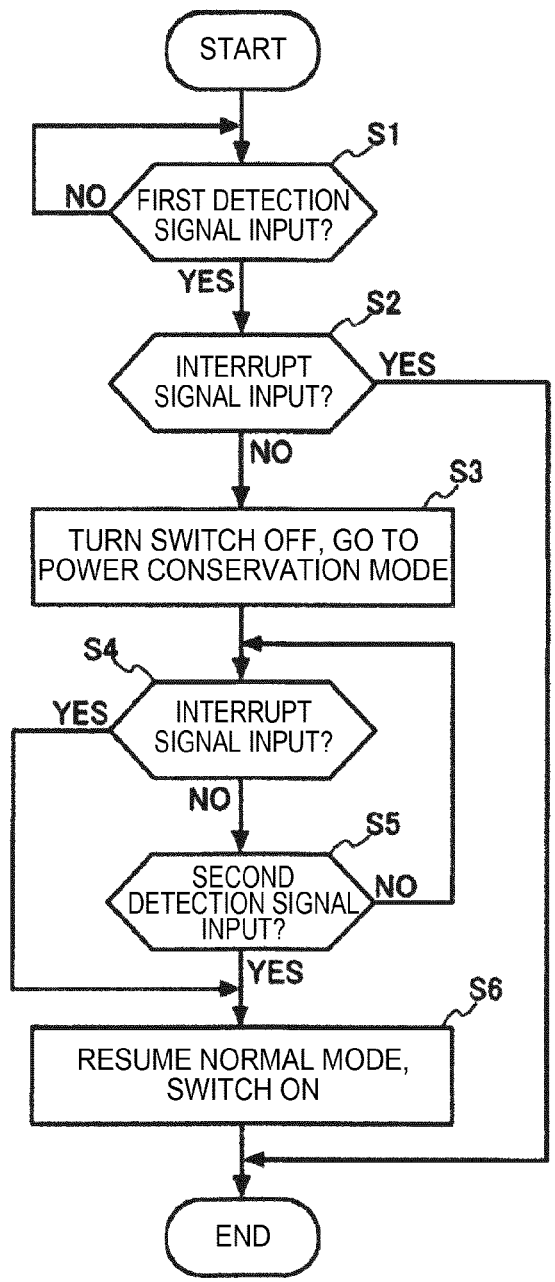
FIG. 22 is a flow chart of an operation of the controller.
Figure 23A:
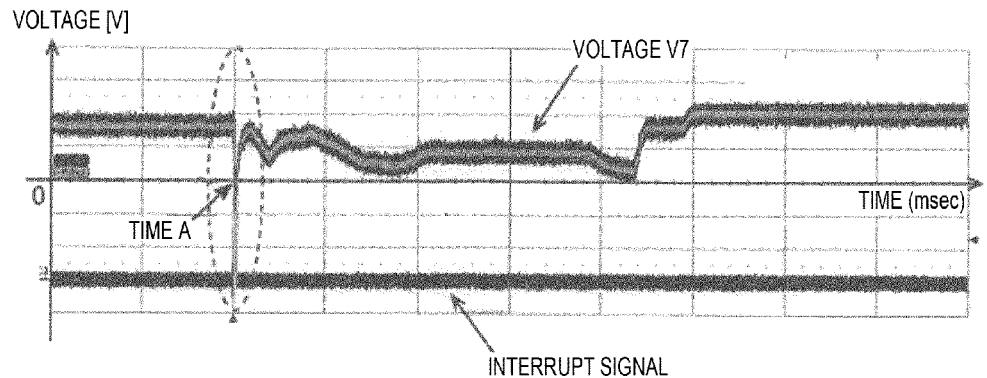
FIG. 23A is a timing chart of the operation of the detection circuit and power supply unit.
Figure 23B:
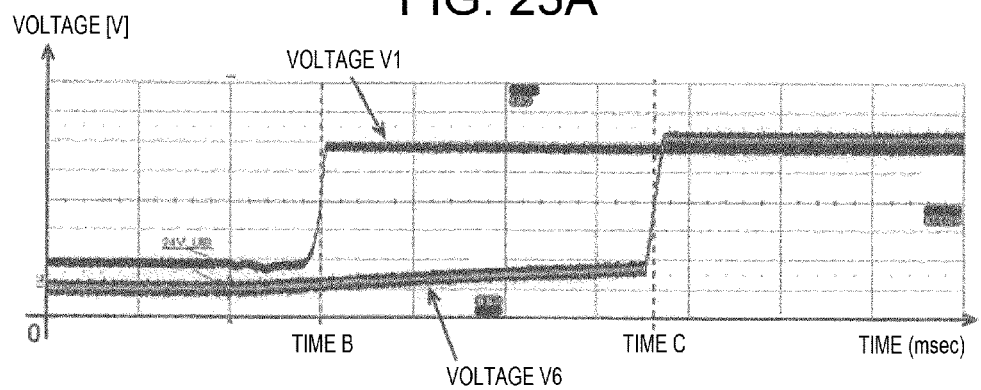
FIG. 23B is a timing chart of the operation of the detection circuit and power supply unit.

FIG. 22 is a flow chart of a process of the controller 100. FIG. 23A and FIG. 23B show the timing of detection circuit and power supply unit 750 operation. FIG. 23A shows the change in voltage V7 and the interrupt signal. FIG. 23B shows the change in voltage V1 input to the power supply circuit, and voltage V6.

The controller 100 first determines if a first detection signal was input from PHY 342 (step S1). PHY 342 monitors the network 5, and outputs the first detection signal to the controller 100 if a control data packet is not received for a previously set time.

If the first detection signal is not input from the PHY 342 (step S1: No), the controller 100 repeats step S1. If the first detection signal is input from the PHY 342 (step S1: Yes), the controller 100 determines if an interrupt signal is input from the detection circuit 37 (step S2). If the controller 100 determines an interrupt signal is input from the detection circuit 37, (step S2: Yes), the controller 100 aborts going to the power conservation mode and ends this process.

If the controller 100 determines an interrupt signal is not input from the detection circuit 37, (step S2: No), the controller 100 turns switch 51 off and goes to the power conservation mode (step S3). By the switch 51 turning on, the supply of voltage V1 to the power supply unit 750 is interrupted, and the voltage used to generate voltage V3 (3.3 V), which is the system voltage, is changed from voltage V1 (24 V) to voltage V2 (5 V). Supplying DC power W4 to the USB controller 331 is also stopped. USB controller 331 applies voltage V2 of DC power W2 supplied from the printing device-side power circuit 15 to the VBUS pin of the USB connector 332.

In the power conservation mode, the controller 100 also operates at a clock rate of a lower operating frequency than the operating clock in the normal mode.

When in the power conservation mode, the controller 100 monitors for input of an interrupt signal from the detection circuit 37. If an interrupt signal is input from the detection circuit 37 (step S4: Yes), the controller 100 changes the operating mode to the normal mode, and turns switch 51 on (step S6). The controller 100 also changes the operating clock from the operating clock of the power conservation mode to a faster clock of a higher operating frequency.

If an interrupt signal from the detection circuit 37 is not input (step S4: No), the controller 100 determines if the second detection signal is input from PHY 342 (step S5). If the second detection signal is not input from PHY 342 (step S5: No), the controller 100 returns to step S4 and monitors for input of an interrupt signal from the detection circuit 37. If the second detection signal is input from PHY 342 (step S5: Yes), the controller 100 turns switch 51 on and returns the operating mode to the normal mode (step S6).

When a USB device connects to the USB connector 332, voltage V7 drops. In the example in FIG. 23A, voltage V7 drops at time A. If the difference between reference voltage V2 and voltage V7 exceeds a previously set threshold due to the drop in voltage V7, the detection circuit 37 outputs an interrupt signal to the controller 100. When an interrupt signal is input, the controller 100 resumes the normal mode and turns switch 51 on.

When switch 51 turns on, the voltage V1 of DC power W1 supplied by the AC adapter 7 rises. In the example in FIG. 23B, voltage V1 rises at time B. Because voltage V1 rises, voltage V6 also rises. In the example in FIG. 23B, voltage V6 rises at time C with a delay from time B.

An operation (printer control method) of the printer 2B according to the third variation is described next with reference to FIG. 24.

Figure 24:
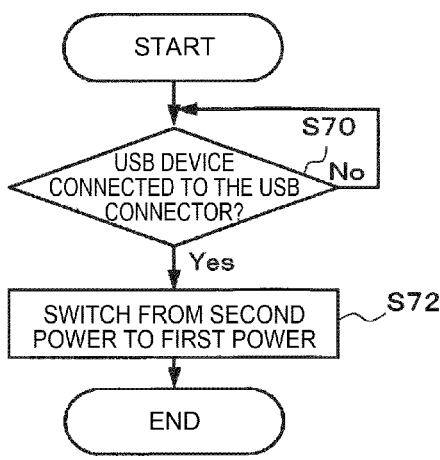
FIG. 24 is a flow chart of an operation of the printer 2B according to the third variation.

FIG. 24 is a flow chart of an operation (printer control method) of the printer 2B according to the third variation.

The process shown in FIG. 24 is executed by the printer 2B, for example.

In this example, the printer 2B is in the power conservation mode, and DC power W2, which is lower than DC power W1, is supplied from the main circuit board 710 through the connector 17 to the expansion board 30.

In this state, the second detector (for example, detection circuit 37) detects whether or not a USB device (USB memory 4) was connected to the USB connector 332 (step S70).

If DC power W2 is supplied through connector 17 and the second detector detects that a USB device was connected to the USB connector 332 (step S70: Yes), the selector (for example, switch 51, OR gate 52) changes the power supplied through connector 17 from the DC power W2 supplied in the power conservation mode to the DC power W1 supplied in the normal mode (step S72). As a result, an insufficient supply of power to the USB device connected to the USB connector 332, operation becoming unstable, and the printer (for example, expansion board controller 100) shutting down, can be prevented.

As described above, the communication processor 35 of the third variation has a USB connector 332, power supply unit 750, and controller 100. USB connector 332 connects to a USB device and can supply power to the USB device. Power supply unit 750 generates the power supplied from the USB connector 332. The controller 100 controls a normal mode and a power conservation mode, supplies the DC power W4 generated by the power supply unit 750 to the USB connector 332 in the normal mode, and in a second mode receives DC power W2, which is lower than DC power W4, from an external source and supplies DC power W2 to the USB connector 332. Power conservation is therefore possible by means of a simple configuration while enabling supplying power to a USB connector 332.

The communication processor 35 has a detection circuit 37 that detects connection of a USB device to USB connector 332. When the detection circuit 37 detects connection of a USB device to USB connector 332, the controller 100 changes the operating mode from the power conservation mode to the normal mode, and resumes supplying DC power W4 from the power supply unit 750. Therefore, the power supplied to the connected USB device increases, and supplying DC power W4 can be resumed before the power supply unit 750 shuts down due to insufficient power.

The communication processor 35 also has a switch 51 that connects and disconnects the supply of power used to generate DC power W4 to the power supply unit 750. To enter the power conservation mode, the controller 100 controls the switch 51 to interrupt the normal mode power supply to the USB connector 332. Therefore, because the supply of DC power W4 is interrupted when the USB device goes to the power conservation mode, power consumption can be reduced.

The communication processor 35 also has a second communicator 34 for Ethernet communication. In the power conservation mode, the controller 100 sets the USB device to a LPI (Low Power Idle) state. Power consumption can therefore be reduced when the USB device is in the power conservation mode.

The communication processor 35 also has a fourth voltage converter 56 with a DC-DC converter that steps down the power supply voltage and generates DC power W4. Voltage can therefore be converted by a simple configuration, and high efficiency voltage conversion is possible.

The third variation described above is a preferred embodiment of the invention. The third variation is not limited to the foregoing, however, and can be varied in many ways without departing from the scope of the invention.

For example, in the third variation the first communicator conforms to the USB standard, but the invention is not so limited. For example, the first communicator may be a communication device or other device compatible with IEEE-1394, HDMI®, or other standard enabling supplying power to a connected device.

The power supply device of the invention is also not limited to a printing device, and can be applied to scanners, hard disk drives, and other devices. The printing device may be a dot impact printer, inkjet printer, dye sublimation printer, or laser printer, for example, and is not limited to any particular type of printing method.

The processes of the communication processor 35 according to the third variation may also be provided as a computer-executable program. The program can also be provided stored on a hard disk drive, optical disc, magneto-optical disc, flash memory device, or other type of recording medium.

The third variation has the following effects in addition to the effects of the second variation.

First, the printer 2B, in the normal mode, supplies DC power W1 (first power; for example, 24 V, 100 mA) from the main circuit board 710 to the expansion board 30 through connector 17; and in the power conservation mode, supplies DC power W2 (second power; for example, 5 V, 100 mA), which is lower than DC power W1, from the main circuit board 710 to the expansion board 30 through connector 17.

Second, when DC power W2 is supplied in the power conservation mode from the main circuit board 710 to the expansion board 30 through connector 17, and USB memory 4 is connected to the USB connector 332, the printer 2B, by the operation of a selector (for example, switch 51, OR gate 52), can change the power supplied from the main circuit board 710 to the expansion board 30 through connector 17 from the DC power W2 supplied in the power conservation mode to the DC power W1 supplied in the normal mode. As a result, an insufficient supply of power to the USB memory 4 connected to the USB connector 332, operation becoming unstable, and the 2b (for example, expansion board controller 100) shutting down, can be prevented.

Note that a configuration adding a configuration (FIG. 19, FIG. 20) for providing a power conservation mode to the configuration of the printer 2A according to the second variation is described as an example of the third variation above, but is not so limited. For example, the effect of the third variation can also be achieved by adding a configuration (FIG. 19, FIG. 20) for providing a power conservation mode to the configuration of the printer 2 according to the second embodiment.

Embodiment 3

A printer and printer control method according to a third embodiment of the invention are described next.

The printing system 1 according to the third embodiment of the invention differs from the printing system 1 of the second embodiment as described below, and is otherwise the same as the printing system 1 of the second embodiment. Specifically, the printing system 1 according to the third embodiment differs in that the USB connector 332 of the printer 2 is connected to the host computer 3 through a USB cable C2; and the memory storing settings information PD is memory 94 integrated with the LAN cable C1 instead of USB memory 4 as in the second embodiment. This third embodiment is described focusing on the differences with the second embodiment, like parts are referenced by like reference numerals, and further description thereof is omitted below.

Figure 27:
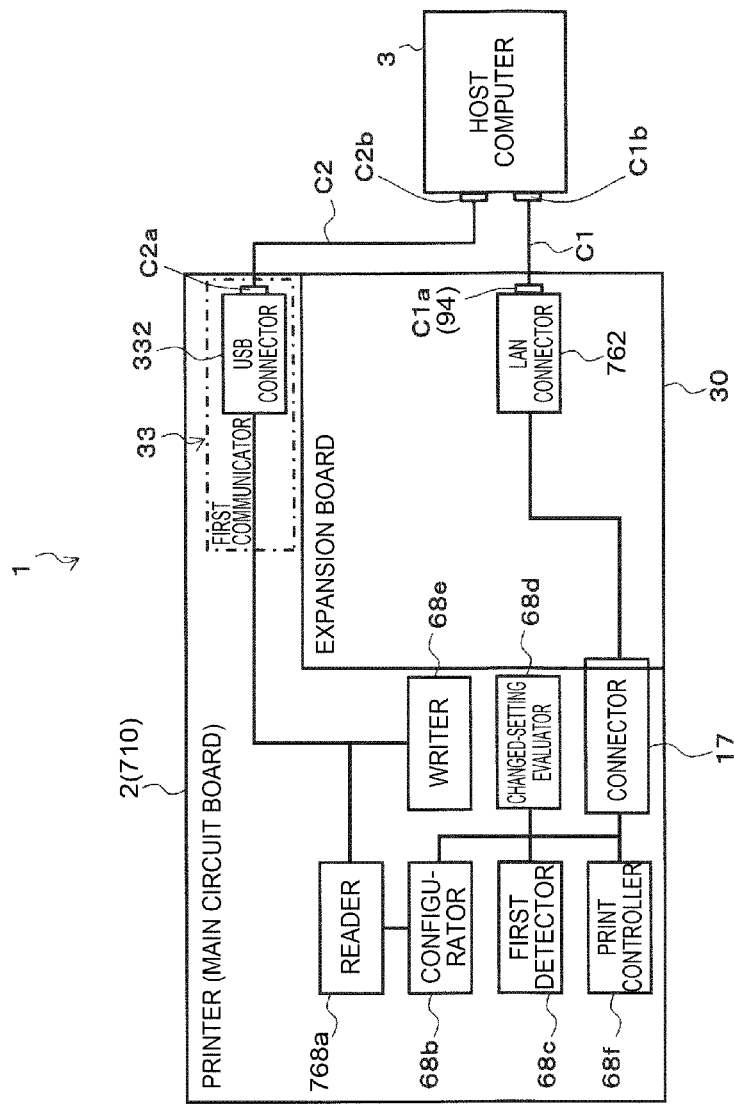
FIG. 27 is a block diagram of an example of the functional configuration of a printer 2 according to the third embodiment of the invention.

FIG. 27 is a block diagram of the functional configuration of the printer 2 according to the third embodiment of the invention.

Figure 26:
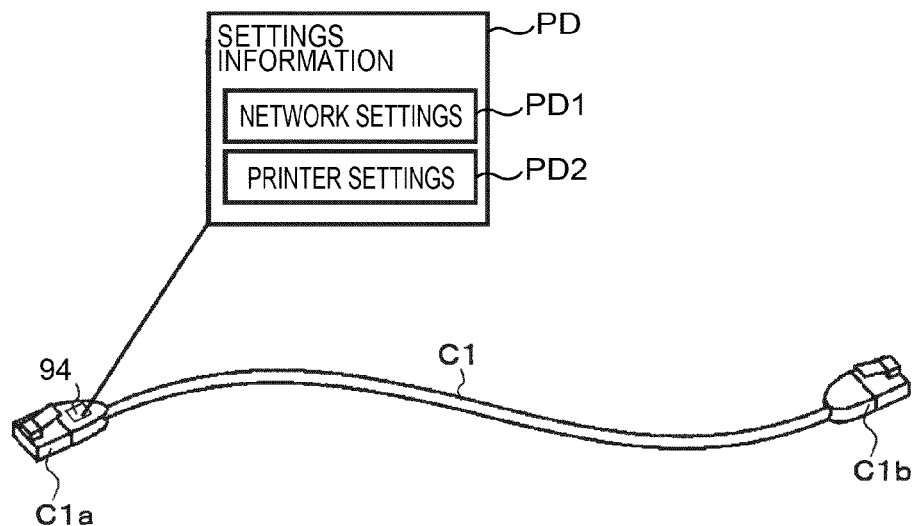
FIG. 26 illustrates a LAN cable C1 with memory 94.

As shown in FIG. 27, the printer 2 has an expansion board 30 (first circuit board) with a LAN connector 762 (first interface) to which can connect a LAN cable C1 (network cable; FIG. 26) with integrated memory 94 storing settings information PD including network settings PD1; and a main circuit board 710 (second circuit board) with a connector 17 (second interface) that can connect to the expansion board 30.

The printer 2 also has a first detector 68c that detects whether or not the expansion board 30 is connected to the connector 17; a reader 768a that, when the first detector 68c detects the expansion board 30 is connected to the connector 17, reads the settings information PD from the memory 94 of the LAN cable C1; and a configurator 68b that configures settings, including network settings for communication with a host computer 3 that connects through the LAN cable C1, based on the settings information PD read by the reader 768a.

The connector 17 is a dedicated connector configured for connecting the main circuit board 710 and expansion board 30 inside the printer 2.

The third embodiment enables even a non-technical user to quickly and accurately set (transfer) the settings information PD (for example, network settings PD1 and printer settings PD2) in a printer 2 (for example, a replacement printer or new printer) having the expansion board 30 and main circuit board 710.

This is enabled by, when the first detector 68c detects the expansion board 30 connected to the connector 17, the reader 768a reading the settings information PD from the memory 94 of the LAN cable C1, and the configurator 68b then configuring settings, including network settings for communication with the host computer 3 connected through the LAN cable C1, based on the settings information PD that was read.

Figure 25:
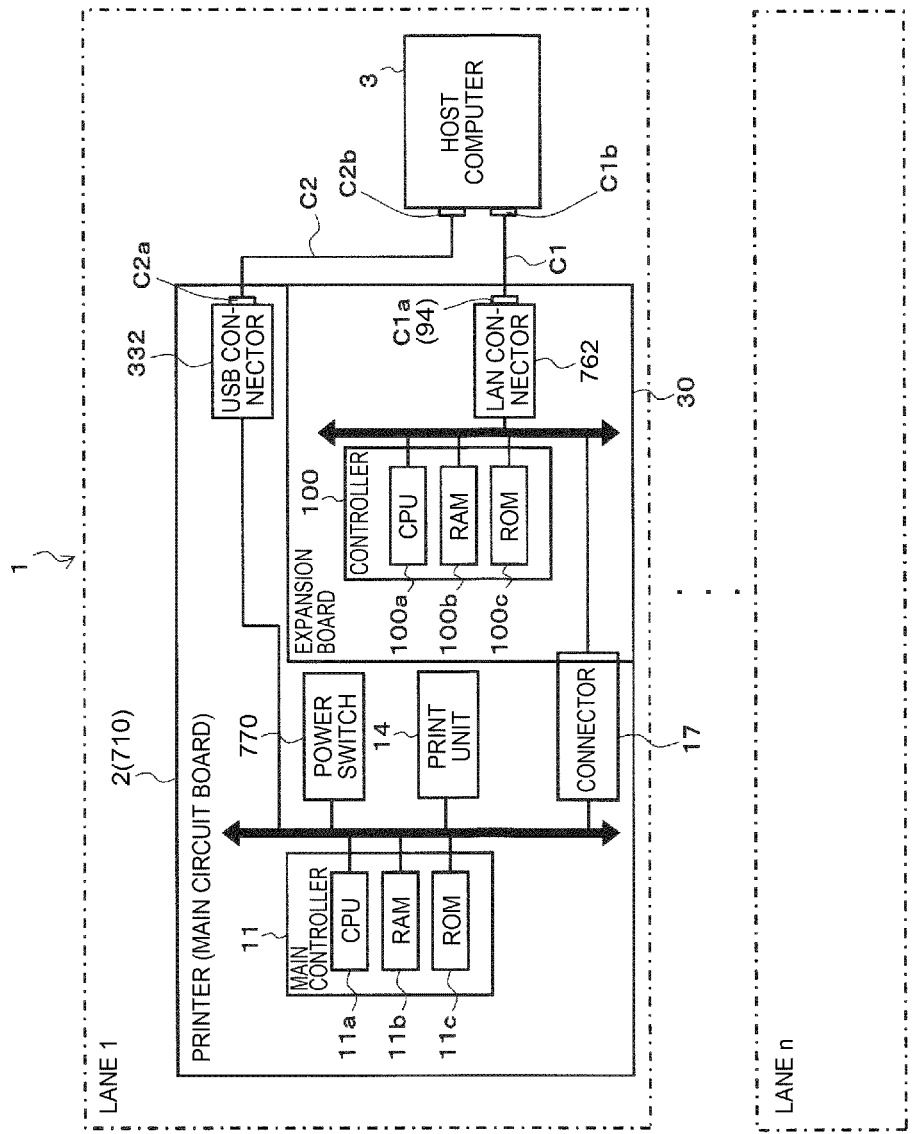
FIG. 25 illustrates the configuration of a printing system 1 using a printer and a printer control method according to the third embodiment of the invention.

FIG. 25 shows an example of the configuration of a printing system 1 employing the printer and printer control method according to this embodiment.

As shown in FIG. 25, the printing system 1 according to the third embodiment of the invention includes a host computer 3, LAN cable C1 with memory 94, USB cable C2, and printer 2 (printing device). The host computer 3, LAN cable C1, USB cable C2, and printer 2 are installed each checkout lane (lane 1 to lane n) in a supermarket or other store, for example.

FIG. 26 illustrates a LAN cable C1 with memory 94.

As shown in FIG. 26, the LAN cable C1 (network cable) has a plug C1a at one end that plugs into (connects to) the printer 2 (LAN connector 762), and a plug C1b at the other end that plugs into (connects to) the host computer 3.

Memory 94 is disposed to the LAN cable C1 (plug C1a). A serial memory device such as 1-wire ROM (for example, Maxim Integrated Products DS2431GA) can be used as the memory 94.

Plugs C1a, C1b are plugs conforming to a standard specification, and have multiple pins according to the standard (8 pins if plug C1a is an RJ-45 plug, for example). Note that the pins may also be referred to as terminals.

Tests demonstrated that, first, because the amount of data communicated is relatively small, the communication speeds of 10BASE-T (maximum 10 Mbps) or 100BASE-T (maximum 100 Mbps) are sufficient for communication between the printer 2 and host computer 3, and can be achieved using four pins (for example, pins 1 to 3 and pin 6 if an RJ-45 plug is used for the plug C1a). This means that the pins other than these four pins are available for other uses.

Second, our tests demonstrated that the spare pins not used for communication between the printer 2 and host computer 3 (for example, if as in this example plug C1a is an RJ-45 plug, pins 4, 5, 7, and 8) can be used for reading settings information PD from memory 94 (or writing data to memory 94).

More specifically, unlike in the related art (for example, JP-A-2011-164872), there is no need to add pins (2 pins) for reading settings information PD from memory 94 to the pins (8 pins) already provided in a standard plug (RJ-45 plug).

Based on this discovery, this third embodiment connects to memory 94 at least part of the four spare pins that are not used for communication between the printer 2 and host computer 3, and uses these pins to access memory 94. For example, if 1-wire ROM is used as the memory 94, this embodiment uses two of the four spare pins to access memory 94. More specifically, pin 4 is connected to the I/O terminal of the 1-wire ROM, and pin 5 is connected to the GND terminal of the 1-wire ROM device. The invention is obviously not so limited, and three or more of the spare pins may be connected to the memory 94 (for example, if I2C communication is used instead of 1-wire communication).

The settings information PD described in the second embodiment are stored in memory 94. The settings information PD includes at least one of network settings PD1 and printer settings PD2. Other information such as the printer ID and lane information is also stored memory 94.

By using spare pins not used for communication between the printer 2 and host computer 3 as pins for reading settings information PD from memory 94, settings information PD can be read from memory 94 using a common plug C1a (RJ-45 plug) conforming to a common standard, and a LAN connector 762 to which the plug C1a connects. More specifically, unlike in the related art (for example, JP-A-2011-164872), there is no need to prepare a special plug and matching special connector adding pins (2 pins) for reading settings information PD from memory 94 to the pins (8 pins) already provided in a plug conforming to a common standard (RJ-45 plug).

The printer 2 of the third embodiment is described next.

As shown in FIG. 25, the hardware configuration of the printer 2 includes an expansion board 30 and a main circuit board 710. The configuration of the expansion board 30 and main circuit board 710 are the same as in the second embodiment, but this printer 2 differs by writing the printer ID and lane information at a specific time to memory 94 through the LAN connector 762 (through a spare pin, such as pin 4). By referencing (or printing) the printer ID and lane information written (stored) to memory 94, the replacement history and other information about the printer 2 at each lane can be easily acquired.

The USB connector 332 is a connector (such as USB Type-B) for connecting the printer 2 to the host computer 3. The printer 2 and host computer 3 are connected by inserting one plug C2a of the USB cable C2 to the printer 2 (USB connector 332), and inserting the other plug C2b to the host computer 3. Note that while not shown in the figures, a USB controller is connected to the USB connector 332.

At specific times, the reader 768a (FIG. 27) reads, through the LAN connector 762 (when the memory 94 is 1-wire ROM, a spare pin, such as pin 4), the settings information PD from the memory 94 integrated with the LAN cable C1 (plug C1a) connected to the LAN connector 762.

The specific time is, for example, when the LAN connector 762 and plug C1a of the LAN cable C1 are connected, the power switch 770 of the printer 2 is on, and the first detector 68c detects the expansion board 30 is connected to the connector 17.

The specific time may also be, for example, when the power switch 770 of the printer 2 is on, and the LAN connector 762 and plug C1a of the LAN cable C1 are then connected.

The writer 68e (FIG. 27) writes the settings information PD to memory 94 through the LAN connector 762 (when the memory 94 is 1-wire ROM, a spare pin, such as pin 4).

For example, the writer 68e, when the changed-setting evaluator 68d determines the network settings PD1 stored in the ROM 100c of the expansion board 30 changed, writes the new network settings PD1 to memory 94 through the LAN connector 762 (a spare pin, such as pin 4). Likewise, the writer 68e, when the changed-setting evaluator 68d determines the printer settings PD2 stored in the ROM 11c of the main circuit board 710 changed, writes the new printer settings PD2 to memory 94 through the LAN connector 762 (a spare pin, such as pin 4).

The first communicator 33 communicates with the host computer 3 through USB connector 332. More specifically, the first communicator 33, when the first detector 68c does not detect the expansion board 30 connected to the connector 17, communicates with the host computer 3 through USB connector 332 (and USB cable C2).

Operation (printer control method) of the printer 2 according to the third embodiment of the invention is described next with reference to FIG. 28.

Figure 28:
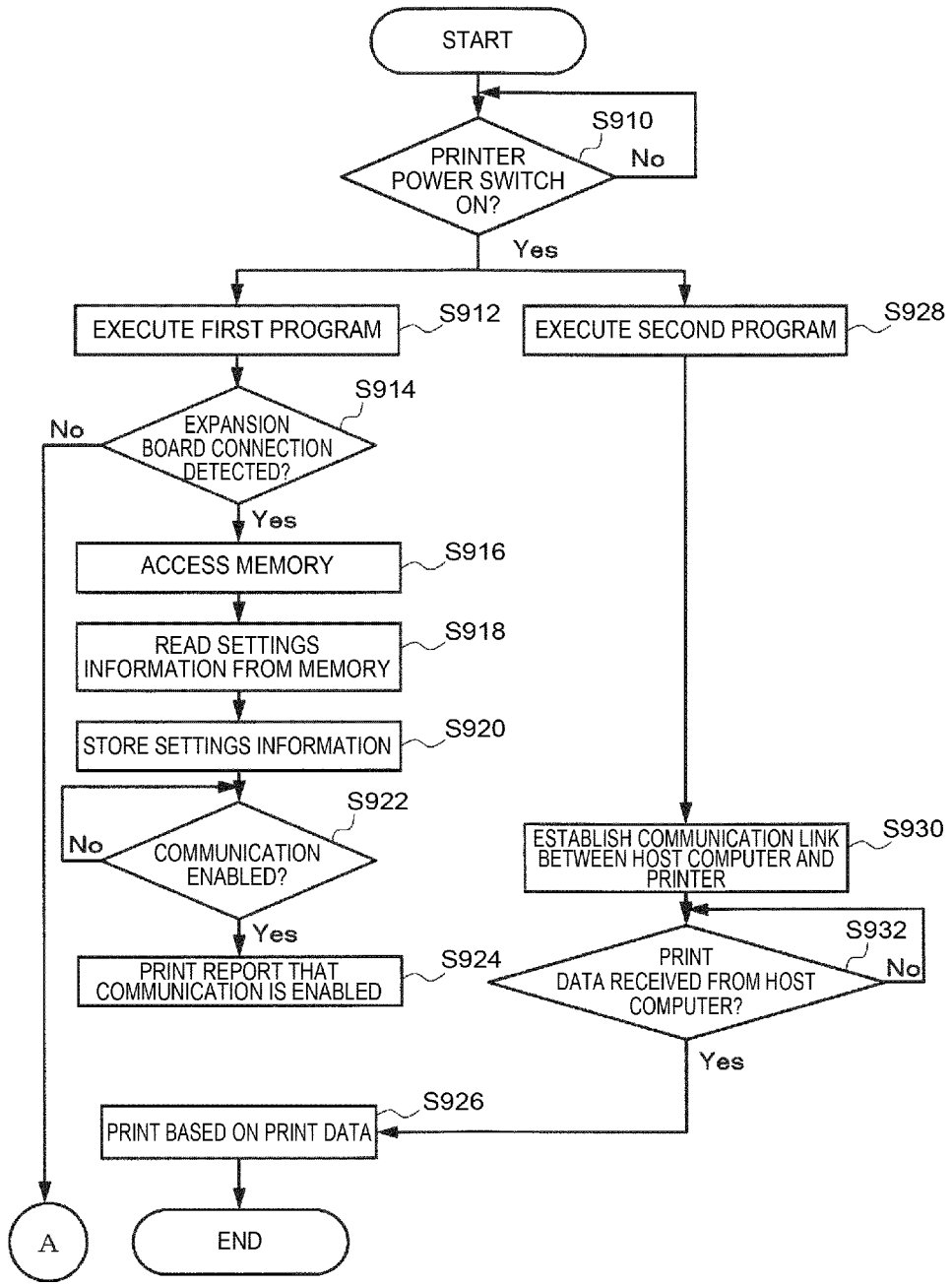
FIG. 28 is a flow chart of an operation of the printer 2.

FIG. 28 is a flow chart of the operation of the printer 2 according to the third embodiment of the invention.

This example describes the operation executed when a printer 2 installed at a specific lane (for example, lane 1) fails in the printing system 1 (POS system) shown in FIG. 25, and the failed printer 2 (referred to below as original printer 2) is replaced with a separate, normally operating printer 2 (referred to below as replacement printer 2).

The process in FIG. 28 is a process executed, for example, by the replacement printer 2.

Note that in the following operation the network settings PD1 (IP address assigned to the lane) and the printer settings PD2 are previously stored as the settings information PD in the memory 94 in the plug C1a of the LAN cable C1. Note that the printer settings PD2 are written to memory 94 as a result of a process described below being executed on the original printer 2 (a process of writing the printer settings PD2 stored in the ROM 11c of the original printer 2 to memory 94; see FIG. 6).

When the printer 2 installed at a specific lane (for example, lane 1) fails, the original printer 2 is replaced by a store employee with the replacement printer 2 by the procedure described below before the process shown in FIG. 28 executes.

First, the employee connects the replacement printer 2 (LAN connector 762) and host computer 3. More specifically, the employee disconnects the LAN cable C1 (plug C1a with memory 94) from the original printer 2 (LAN connector 762), and connects the disconnected LAN cable C1 to the replacement printer 2 (LAN connector 762). The employee also disconnects the USB cable C2 (plug C2a) from the printer 2 (USB connector 332), and connects the disconnected USB cable C2 to the replacement printer 2 (USB connector 332). Because the memory 94 storing the settings information PD is in the LAN cable C1 (plug C1a) (FIG. 26), this has the following effect.

First, the employee does not need to prepare a separate external memory device every time a printer 2 is replaced.

Second, managing the memory 94 storing the settings information PD is easier than in the related art (for example, JP-A-2011-164872), and the employee can prepare an appropriate memory 94 storing the settings information PD to be set in the replacement printer 2 more quickly than in the related art.

Third, there is no chance of the employee preparing a memory 94 storing the incorrect settings information PD, that is, settings information PD that is different from the settings information PD that should be set in the printer 2. As a result, the correct settings information PD can be set in the replacement printer 2.

Fourth, there is no chance of the memory 94 being lost.

Because memory 94 storing settings information PD is integrated in the LAN cable C1 (plug C1a), when a printer 2 is replaced, even a non-technical user can quickly and correctly set the settings information PD of the original printer 2 (for example, network settings PD1 and printer settings PD2) in the replacement printer 2.

Note that the replacement printer 2 (LAN connector 762) and host computer 3 are connected by the LAN cable C1, and the replacement printer 2 (USB connector 332) and host computer 3 are connected by USB cable C2, while the power switch 770 of the replacement printer 2 is off.

Next, the employee turns the power switch 770 of the replacement printer 2 on.

When the power switch 770 of the replacement printer 2 turns on (step S910: Yes), the CPU 11a on the main circuit board 710 of the replacement printer 2 executes a specific program (first program) such as firmware read from ROM 11c to RAM 11b (step S912). As a result, steps step S914 to S926 are executed.

The CPU 100a on the expansion board 30 of the replacement printer 2 also executes a specific program (second program) such as firmware read from ROM 100c to RAM 100b (step S928). As a result, steps step S930 to S932 are executed.

More specifically, the first detector 68c of the main circuit board 710 first detects if the expansion board 30 was connected to the connector 17 (step S914). This is an example of a detection step of the invention.

Because the expansion board 30 is connected to the connector 17, the first detector 68c of the main circuit board 710 detects that the expansion board 30 is connected to the connector 17 (step S914: Yes).

When connection of the expansion board 30 to the connector 17 is detected (step S914: Yes), the reader 768a of the main circuit board 710 accesses memory 94 (step S916), and reads the settings information PD from the memory 94 through the LAN connector 762 (spare pin, such as pin 4) (step S918). This is an example of the read step of the invention.

Because network settings PD1 (IP address assigned to the lane) and printer settings PD2 are stored as the settings information PD in memory 94, the network settings PD1 and printer settings PD2 are read. Note that if configured so that at least one of network settings PD1 and printer settings PD2 is read, at least one of network settings PD1 and printer settings PD2 is read based on this setting.

As described above, the reader 768a of the main circuit board 710 reads the settings information PD from memory 94 through the LAN connector 762 (spare pin, such as pin 4) at a specific time, which in this example is when the LAN connector 762 and the plug C1a of the LAN cable C1 are connected, the power switch 770 of the printer 2 is on (step S910: Yes), and the first detector 68c detects that the expansion board 30 is connected to the connector 17 (step S914: Yes).

Next, the configurator 68b of the main circuit board 710 sets the network settings PD1 from the settings information PD read by the reader 768a on the expansion board 30, and sets the printer settings PD2 on the main circuit board 710 (step S920). This is an example of a configuration step of the invention. More specifically, the configurator 68b of the main circuit board 710 stores the network settings PD1 from the settings information PD read by the reader 768a in the ROM 100c of the expansion board 30, and stores the printer settings PD2 in the ROM 11c of the main circuit board 710. More specifically, the configurator 68b, based on the settings information PD read by the reader 768a, configures the network settings for communication with the host computer 3 connected through the LAN cable C1.

As described above, the settings information PD (network settings PD1 and printer settings PD2) are quickly and accurately set in (transferred to) the replacement printer 2.

Once the settings information PD is set (transferred) in the replacement printer 2, a communication link (such as a TCP connection) is established between the host computer 3 and replacement printer 2 (step S930) in the same way as in step S730 of the second embodiment shown in FIG. 14. Next, steps S922, S924, S932, S926 corresponding to steps S722, S724, S732, S726 in FIG. 14 are executed.

A process executed when an expansion board 30 is not connected to the connector 17 is described next with reference to FIG. 29.

Figure 29:
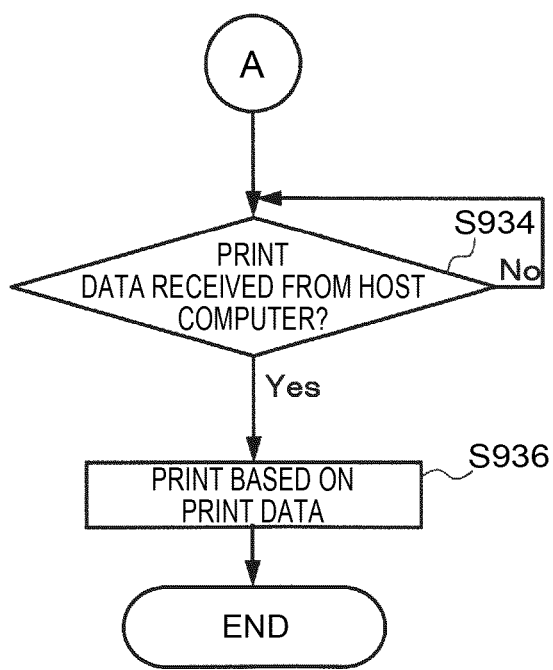
FIG. 29 is a flow chart of an example of a process executed when an expansion board 30 is not connected to the connector 17.

FIG. 29 is a flow chart showing an example of a process executed when an expansion board 30 is not connected to the connector 17.

When the first detector 68c does not detect an expansion board 30 connected to the connector 17 (step S914: No), that is, when an expansion board 30 is not connected to the connector 17, the printer 2 (first communicator 33) communicates with the host computer 3 through USB connector 332 (and USB cable C2). For example, by the first communicator 33 communicating with the host computer 3 through USB connector 332 (and USB cable C2), the printer 2 receives print data from the host computer 3 through the USB cable C2 (and USB connector 332).

As shown in FIG. 29, when print data is then received from the host computer 3 through USB cable C2 (and USB connector 332) (step S934: Yes), the print controller 68f of the replacement printer 2, based on the received print data and the printer settings PD2 set in the replacement printer 2 (main circuit board 710), controls the print unit 14 (print mechanism) to print a receipt (step S936).

As described above, even when an expansion board 30 is not connected to the connector 17 (second interface) (step S914: No), the first communicator 33 (communicator) enables communication with the host computer 3 through the USB connector 332 (third interface).

Note that a process for writing settings information PD (printer settings PD2) stored in ROM 11c of the printer 2 (main circuit board 710) to memory 94 is the same as in the second embodiment and described in FIG. 15. In other words, whenever a printer setting PD2 is changed, the printer settings PD2 are written to memory 94 through LAN connector 762 (spare pin, such as pin 4) instead of to USB memory 4 as in FIG. 15, but the processes are otherwise the same.

As described above, the printer settings PD2 stored in the ROM 11c of the original printer 2 are written (for example, overwritten) to the memory 94 whenever part of the printer settings PD2 changes. Note that the network settings PD1 stored in the ROM 100c of the original printer 2 are also written (for example, overwritten) to memory 94 whenever the network settings PD1 change.

As described above, the third embodiment of the invention provides a printer and a printer control method enabling even a non-technical user to quickly and correctly set (transfer) settings information PD (for example, network settings PD1 and printer settings PD2) in a printer 2 (for example, a replacement printer or a new printer) having an expansion board 30 (first circuit board) and main circuit board 710 (second circuit board), and a USB connector 332 (third interface) disposed to the main circuit board 710.

This is enabled by, when connection of the expansion board 30 to the connector 17 (second interface) is detected by the first detector 68c of the main circuit board 710 (step S914: Yes), the reader 768a reading the settings information PD from the memory 94 of the plug C1a of the LAN cable C1 (network cable), and the configurator 68b then configuring the network settings for communication with the host computer 3 through the LAN cable C1 (network cable) based on the settings information PD that was read.

Even when an expansion board 30 is not connected to the connector 17 (second interface) (step S914: No) in the third embodiment, the first communicator 33 (communicator) enables communication with the host computer 3 through the USB connector 332 (third interface).

The third embodiment also enables reading settings information PD from memory 94 using a standard common plug C1a (RJ-45 plug) and a LAN connector 762 accepting the plug C1a instead of needing to use a special plug, and a special connector accepting the plug, adding pins (2 pins) for reading settings information PD from memory 94 to the pins (8 pins) already provided in a plug conforming to a common standard (RJ-45 plug), as described in the related art (for example, JP-A-2011-164872).

This is enabled by using spare pins in the pins of the plug C1a of the LAN cable C1 that are not used for communication between the printer 2 and host computer 3 to read settings information PD from the memory 94. For example, if as in this example plug C1a is an RJ-45 plug, using pins 4, 5, 7, and 8 for reading print data from memory 94.

When settings information PD is changed on the original printer 2 (changed based on an operation of the host computer 3, for example), the third embodiment also enables even a non-technical user to quickly and correctly set the new (changed) settings information PD in the replacement printer 2.

The third embodiment also enables setting settings information PD in a replacement printer 2 by the extremely simple step of an employee turning the power switch 770 of the printer 2 on after the LAN connector 762 and the plug C1a of the LAN cable C1 are connected.

The third embodiment describes the reader 768a reading settings information PD from the memory 94 through the LAN connector 762 (spare pin, such as pin 4) (step S918) at a specific time, such as when the power switch 770 of the printer 2 turns on (step S910: Yes), but the invention is not so limited.

For example, the reader 768a may read the settings information PD from the memory 94 through the LAN connector 762 (spare pin, such as pin 4) at a different specific time, such as when the LAN connector 762 and the plug C1a of the LAN cable C1 are connected while the power switch 770 of the replacement printer 2 is on.

The third embodiment, like the second embodiment, may also be configured as described below.

That is, the printer 2 may be a printer other than a receipt printer.

The printer and printer control method of the invention can also be applied to a new printer 2 installed to a specific lane (for example, lane n+1) in the printing system 1.

A network address other than an IP address may also be used as a network setting PD1.

One or more of the reader 768a, configurator 68b, first detector 68c, changed-setting evaluator 68d, writer 68e, and print controller 68f may also be embodied by the CPU 100a of the expansion board 30 executing a second program.

Furthermore, the first interface is not limited to a LAN connector 762, the second interface is not limited to a connector 17, and other appropriate interfaces may be used.

A serial interface, parallel interface, or other interface may also be used as the third interface.

The second variation (FIG. 16 to FIG. 18) and the third variation (FIG. 19 to FIG. 24) described in the second embodiment can also be applied to the third embodiment without changing the technical features thereof. In this case, the timing and means for the reader 768a to read the settings information PD from memory 94 (corresponding to USB memory 4 in the second embodiment), and the network settings the configurator 68b applies for communication with the host computer 3, conform to the third embodiment.

When the third variation is applied to the third embodiment, the printer 2 has a power supply unit (for example, AC adapter 7, and printing device-side power circuit 15), and the system configuration and operation conform to the description using FIG. 19 to FIG. 24. In this case, the host computer 3 is a USB device that connects to USB connector 332 through USB cable C2, and the second detector (detection circuit 37) in FIG. 20 detects if a host computer 3 is connected to the USB connector 332.

The second variation applied to the third embodiment has the same effect as the third embodiment.

Applying the third variation to the third embodiment also has the following effect.

First, in the normal mode, DC power W1 (first power; for example, 24 V, 100 mA) can be supplied from the main circuit board 710 to the expansion board 30 through the connector 17 (second interface); and in the power conservation mode, DC power W2 (second power; for example, 5 V, 100 mA) which is lower than DC power W1, can be supplied from the main circuit board 710 to the expansion board 30 through the connector 17.

Second, when the DC power W2 of the power conservation mode is supplied from the main circuit board 710 to the expansion board 30 through the connector 17, and the host computer 3 (plug C2a of USB cable C2) is connected to USB connector 332, the printer 2B, operation of the selector (for example, switch 51, OR gate 52) can switch the power supplied from the main circuit board 710 through the connector 17 to the expansion board 30 from the DC power W2 of the power conservation mode to the DC power W1 of the normal mode. As a result, an insufficient supply of power to the USB device connected to the USB connector 332, operation becoming unstable, and the printer 2B (for example, expansion board controller 100) shutting down, can be prevented.

The invention is not limited to the foregoing embodiments and variations, and can be configured in many different ways without departing from the scope of the invention. For example, the technical features of the embodiments and variations can, to solve part or all of the foregoing problems, or to achieve part or all of the described effects, can be interchanged or combined as needed. Furthermore, unless stated herein as essential, technical features described herein can be omitted as needed.

What is claimed is:

1. A printer comprising:
a print mechanism;
a first communicator configured to communicate through a network with a computer;
a memory connection port configured to removably connect to a memory device, wherein the memory device has a memory that stores settings information including network settings information;
a first detector configured to detect if the memory device is connected to the memory connection port;
a reader configured to read the settings information from the memory of the memory device when installation of the memory device to the memory connection port is detected by the first detector; and
a network setting configurator configured to set a network setting of the first communicator based on the settings information read by the reader;
a first circuit board including the network connection port;
a second circuit board including a circuit board connection port able to connect to the first circuit board; and
a second detector configured to detect whether or not the first circuit board is connected to the circuit board connection port,
wherein the first communicator is a network connection port able to connect to the network,
wherein the memory device that includes the memory can be installed onto the memory connection port,
wherein the reader, when connection of the first circuit board to the circuit board connection port is detected by the second detector, reads the settings information from the memory of the memory device installed onto the memory connection port.

2. The printer described in claim 1, wherein:
the first detector detects whether or not the memory device is installed onto the memory connection port when the printer power turns on or the printer is reset.

3. The printer described in claim 1, further comprising:
a print controller configured to, when the network setting is set by the network setting configurator and the first communicator becomes able to communicate with the computer through the network, control the print mechanism to print a report indicating that communication is enabled.

4. The printer described in claim 1, wherein:
the second circuit board comprises the memory connection port.

5. A printer comprising:
a print mechanism;
a first communicator configured to communicate through a network with a computer;
a memory connection port configured to removably connect to a memory device, wherein the memory device has a memory that stores settings information including network settings information;
a first detector configured to detect if the memory device is connected to the memory connection port;
a reader configured to read the settings information from the memory of the memory device when installation of the memory device to the memory connection port is detected by the first detector; and
a network setting configurator configured to set a network setting of the first communicator based on the settings information read by the reader,
wherein the memory is included in a wireless tag, and
wherein the reader reads the settings information from the wireless tag by wireless communication.

6. The printer described in claim 5, wherein:
the memory device comprises a cover assembly configured to removably attach to a portion of the printer; and
the wireless tag is disposed on the cover assembly.

7. The printer described in claim 6, wherein:
the wireless tag is positioned opposite the reader or opposite a circuit board surface on which the reader is positioned when the cover assembly is attached to the printer.

8. The printer described in claim 6, wherein:
the cover assembly covers at least part of a power cable that supplies power to the printer.

9. A printer comprising:
a print mechanism;
a first communicator configured to communicate through a network with a computer;
a memory connection port configured to removably connect to a memory device, wherein the memory device has a memory that stores settings information including network settings information;
a first detector configured to detect if the memory device is connected to the memory connection port;
a reader configured to read the settings information from the memory of the memory device when installation of the memory device to the memory connection port is detected by the first detector; and a network setting configurator configured to set a network setting of the first communicator based on the settings information read by the reader, a first circuit board including the network connection port; and a second circuit board including a circuit board connection port able to connect to the first circuit board, wherein the first communicator is a network connection port able to connect to the network, wherein the memory device that includes the memory can be installed onto the memory connection port, wherein the first circuit board comprises the memory connection port;

wherein the second circuit board has a second circuit board-side processor and second circuit board-side memory, wherein the first circuit board has a first circuit board-side processor and first circuit board-side memory;

wherein the printer further comprises a reporter is configured to report, when a second detector detects the first circuit board is connected to the circuit board connection port, a detection result to the first circuit board-side processor;

wherein the second detector and the reporter are embodied by the second circuit board-side processor executing a second program stored in the second circuit board-side memory, wherein the reader and the network setting configurator are embodied by the first circuit board-side processor executing a first program stored in the first circuit board-side memory, and wherein the reader, when the detection result is reported by the reporter, reads the settings information from the memory of the memory device installed onto the memory connection port.

10. The printer described in claim 9, wherein:
the second circuit board-side processor executes another process when a process is being executed by the reader or the network setting configurator.

11. A printer comprising:
a print mechanism;
a first communicator configured to communicate through a network with a computer;
a memory connection port configured to removably connect to a memory device, wherein the memory device has a memory that stores settings information including network settings information;
a first detector configured to detect if the memory device is connected to the memory connection port;
a reader configured to read the settings information from the memory of the memory device when installation of the memory device to the memory connection port is detected by the first detector; and
a network setting configurator configured to set a network setting of the first communicator based on the settings information read by the reader,
a first circuit board including the network connection port; and
a second circuit board including a circuit board connection port able to connect to the first circuit board,
wherein the first communicator is a network connection port able to connect to the network,
wherein the memory device that includes the memory can be installed onto the memory connection port, wherein the second circuit board can supply a first power or a second power that is lower than the first power through the circuit board connection port to the first circuit board,
wherein the printer further comprises a selector configured to switch the power supplied to the first circuit board from the second power to the first power, and
wherein the selector switches the power supplied to the first circuit board from the second power to the first power when installation of the memory device onto the memory connection port is detected by the first detector and while the second power is supplied to the first circuit board.

12. A printer comprising:
a print mechanism;
a first communicator configured to communicate through a network with a computer;
a memory connection port configured to removably connect to a memory device, wherein the memory device has a memory that stores settings information including network settings information;
a first detector configured to detect if the memory device is connected to the memory connection port;
a reader configured to read the settings information from the memory of the memory device when installation of the memory device to the memory connection port is detected by the first detector; and
a network setting configurator configured to set a network setting of the first communicator based on the settings information read by the reader,
wherein the memory device is a network cable assembly;
wherein the first communicator and the memory connection port are a network connection port to which the network cable assembly can connect;
wherein the printer further comprises
a first circuit board including the network connection port;
a second circuit board including a circuit board connection port able to connect to the first circuit board; and
a second detector configured to detect whether or not the first circuit board is connected to the circuit board connection port;
wherein the reader, when connection of the first circuit board to the circuit board connection port is detected by the second detector, reads the settings information from the memory from the network cable assembly.

13. The printer described in claim 12, wherein the first circuit board comprises the memory connection port to which the computer can connect.

14. The printer described in claim 13, wherein the second circuit board comprises the memory connection port to which the computer can connect.

15. The printer described in claim 14, further comprising:
a second communicator configured to communicate with the computer through the memory connection port when the second detector does not detect connection of the first circuit board to the circuit board connection port.

16. The printer described in claim 13, further comprising:
a power supply unit configured to supply a first power or a second power that is lower than the first power from the second circuit board, through the circuit board connection port, and to the first circuit board;
wherein the first detector is configured to detect whether or not the computer is connected to the memory connection port, wherein the printer further comprises a selector configured to switch the power supplied from the power supply unit through the circuit board connection port from the second power to the first power, wherein the selector switches the power supplied through the circuit board connection port from the second power to the first power when the second power is supplied through the circuit board connection port and connection of the computer to the memory connection port is detected by the first detector.

17. The printer described in claim 13, wherein:

the network cable assembly has a plug connectable to the network connection port;

the plug has multiple pins conforming to a standard of the network; and the reader, when connection of the first circuit board to the circuit board connection port is detected by the second detector, reads the settings information from the memory through a spare pin of the multiple pins, wherein the spare pin is not used to communicate with the computer.

18. A control method of configuring a printer, the printer having a first communicator configured to communicate through a network with a computer, a memory connection port configured to removably connect to a memory device, wherein the memory device has a memory that stores settings information including network settings information, a first detector configured to detect if the memory device is connected to the memory connection port, a storage unit storing a program, a processor that reads and executes the program from the storage unit, a first circuit board including the network connection port; a second circuit board including a circuit board connection port able to connect to the first circuit board; and a second detector configured to detect whether or not the first circuit board is connected to the circuit board connection port, wherein the first communicator is a network connection port able to connect to the network, wherein the memory device that includes the memory can be installed onto the memory connection port, wherein the reader, when connection of the first circuit board to the circuit board connection port is detected by the second detector, reads the settings information from the memory of the memory device installed onto the memory connection port, the control method comprising:

reading the settings information from the memory of the memory device when installation of the memory device to the memory connection port is detected by the first detector; and setting a network setting of the first communicator based on the settings information, wherein the control method utilizes the processor.

* * * * *